United States Patent
Toba et al.

(10) Patent No.: US 9,036,090 B2
(45) Date of Patent: May 19, 2015

(54) TRANSMITTING DEVICE, TRANSMITTING METHOD, AND RECEIVING DEVICE

(71) Applicant: Sony Corporation, Tokyo (JP)

(72) Inventors: Kazuaki Toba, Kanagawa (JP); Gen Ichimura, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/350,659

(22) PCT Filed: Oct. 5, 2012

(86) PCT No.: PCT/JP2012/076051
§ 371 (c)(1),
(2) Date: Apr. 9, 2014

(87) PCT Pub. No.: WO2013/058133
PCT Pub. Date: Apr. 25, 2013

(65) Prior Publication Data
US 2014/0240604 A1    Aug. 28, 2014

(30) Foreign Application Priority Data

Oct. 17, 2011  (JP) ................................. 2011-228370

(51) Int. Cl.
| | |
|---|---|
| H04N 5/38 | (2006.01) |
| H04N 5/40 | (2006.01) |
| H04N 21/4363 | (2011.01) |
| G09G 5/00 | (2006.01) |

(52) U.S. Cl.
CPC ........... *H04N 5/38* (2013.01); *H04N 21/43635* (2013.01); *G09G 5/006* (2013.01)

(58) Field of Classification Search
USPC ........ 348/723–726, 192, 194, 21; 725/67, 98, 725/118, 148

IPC ................. H04N 5/38, 5/40, 5/44, 5/455, 17/00, H04N 17/02
See application file for complete search history.

(56) References Cited

U.S. PATENT DOCUMENTS

| | | | |
|---|---|---|---|
| 7,088,632 B2 | 8/2006 | Pelley | |
| 8,204,076 B2 | 6/2012 | Kobayashi | |
| 8,230,118 B2 * | 7/2012 | Toba et al. | 710/5 |

(Continued)

FOREIGN PATENT DOCUMENTS

| | | |
|---|---|---|
| JP | 2006-074075 A | 3/2006 |
| JP | 2007-311927 A | 11/2007 |

(Continued)

OTHER PUBLICATIONS

Non-Patent Document 1: High-Definition Multimedia Interface Specification Version 1.3a, Nov. 10, 2006, pp. ii-156 and Supplement 1 Consumer Electronics Contol (CEC), pp. ii-97.

*Primary Examiner* — Sherrie Hsia
(74) *Attorney, Agent, or Firm* — Lerner, David, Littenberg, Krumholz & Mentlik, LLP

(57) ABSTRACT

A data transmitting device may include a first data transmitting unit and a second transmitting unit. The second data transmitting unit transmits to an external device video data encoded so as to be DC-free and capable of clock regeneration, via a pair of AC-coupled lines as a transmission path. Accordingly, it is possible to increase the transmission bandwidth of video data while improving signal quality and reducing power consumption. In addition, bi-directional transmission may be allowed which may enable new applications for inter-room transmission and the like.

20 Claims, 36 Drawing Sheets

(56) References Cited

U.S. PATENT DOCUMENTS

| | | |
|---|---|---|
| 8,564,723 B2 | 10/2013 | Nakajima |
| 2010/0128182 A1 | 5/2010 | Ichimura et al. |
| 2011/0206355 A1* | 8/2011 | Toba et al. .................... 386/355 |

FOREIGN PATENT DOCUMENTS

| | | |
|---|---|---|
| JP | 2008-500675 A | 1/2008 |
| JP | 2008-278488 A | 11/2008 |
| JP | 2009-130606 A | 6/2009 |

* cited by examiner

FIG. 2
(a) "CASE 1"
(b) "CASE 2"
(c) "CASE 3"
(d) "CASE 4"

CONVENTIONAL HDMI SYSTEM

FIG. 10

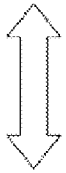

(a) CONVENTIONAL HDMI PIN CONFIGURATION (Type-A)

| PIN | Signal Assignment |
|---|---|
| 1 | TMDS Data#2+ |
| 2 | TMDS Data#2 Shield |
| 3 | TMDS Data#2− |
| 4 | TMDS Data#1+ |
| 5 | TMDS Data#1 Shield |
| 6 | TMDS Data#1− |
| 7 | TMDS Data#0+ |
| 8 | TMDS Data#0 Shield |
| 9 | TMDS Data#0− |
| 10 | TMDS Clock+ |
| 11 | TMDS Clock Shield |
| 12 | TMDS Clock− |
| 13 | CEC |
| 14 | Reserve |
| 15 | SCL |
| 16 | SDA |
| 17 | DDC/CEC Ground |
| 18 | +5V Power |
| 19 | Hot Plug Detect |

(b) NEW HDMI PIN CONFIGURATION

| PIN | Signal Assignment |
|---|---|
| 1 | TMDS Data#2+ |
| 2 | NEW TMDS Data#1+ |
| 3 | TMDS Data#2− |
| 4 | TMDS Data#1+ |
| 5 | NEW TMDS Data#1− |
| 6 | TMDS Data#1− |
| 7 | TMDS Data#0+ |
| 8 | NEW TMDS Data#0+ |
| 9 | TMDS Data#0− |
| 10 | TMDS Clock+ |
| 11 | NEW TMDS Data#0− |
| 12 | TMDS Clock− |
| 13 | CEC |
| 14 | Reserve |
| 15 | SCL |
| 16 | SDA |
| 17 | DDC/CEC Ground |
| 18 | +5V Power |
| 19 | Hot Plug Detect |

FIG. 11
(a) CONVENTIONAL HDMI PIN ALIGNMENT
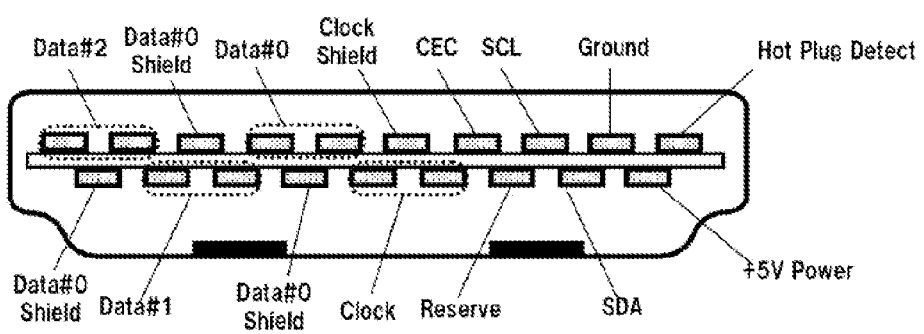
(b) NEW HDMI PIN ALIGNMENT
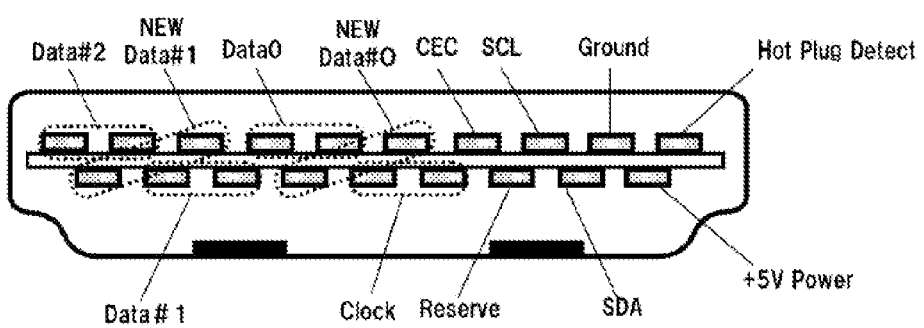

FIG. 16
(a) 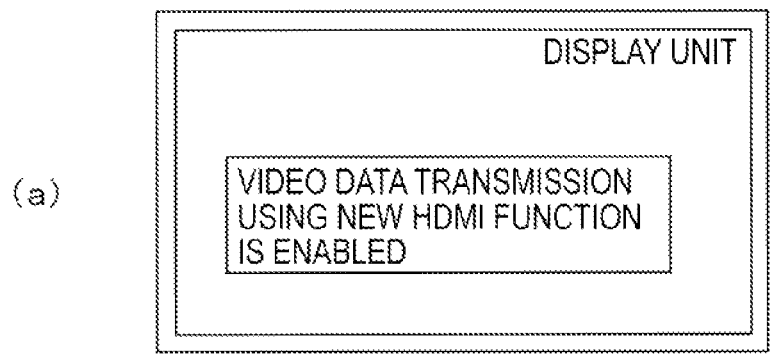
(b) 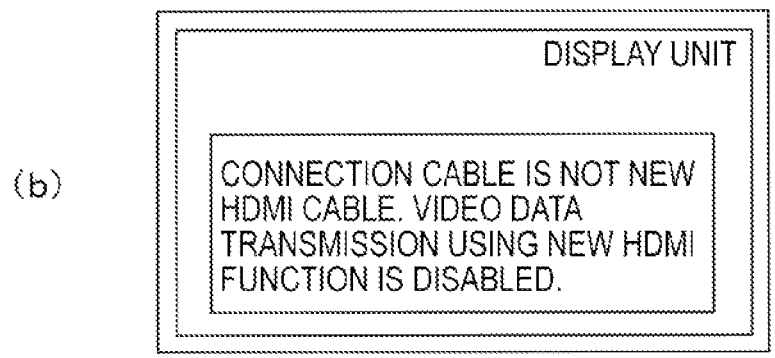

FIG. 20

Vendor Specific InfoFrame

| Packet Byte # | 7 | 6 | 5 | 4 | 3 | 2 | 1 | 0 |
|---|---|---|---|---|---|---|---|---|
| PB0 | Checksum ||||||||
| PB1 | 24bits IEEE Registration Identifier<br>(least significant byte first) ||||||||
| PB2 | ||||||||
| PB3 | ||||||||
| PB4 | Category code ||||||||
| PB5 | DualLink | Rsvd (0) | Rsvd (0) | Rsvd (0) | Rsvd (0) | Rsvd (0) | Rsvd (0) | Rsvd (0) |
| PB6 | Time Code 0 (Units of frames) ||||||||
| PB7 | Time Code 0 (Units of seconds) ||||||||
| PB8 | Time Code 0 (Units of minutes) ||||||||
| PB9 | Time Code 0 (Units of hours) ||||||||
| PB10 | Even/Odd | Rsvd (0) | Rsvd (0) | Rsvd (0) | Rsvd (0) | Rsvd (0) | Rsvd (0) | Rsvd (0) |
| ...PB(Nv) | Reserved(0) ||||||||

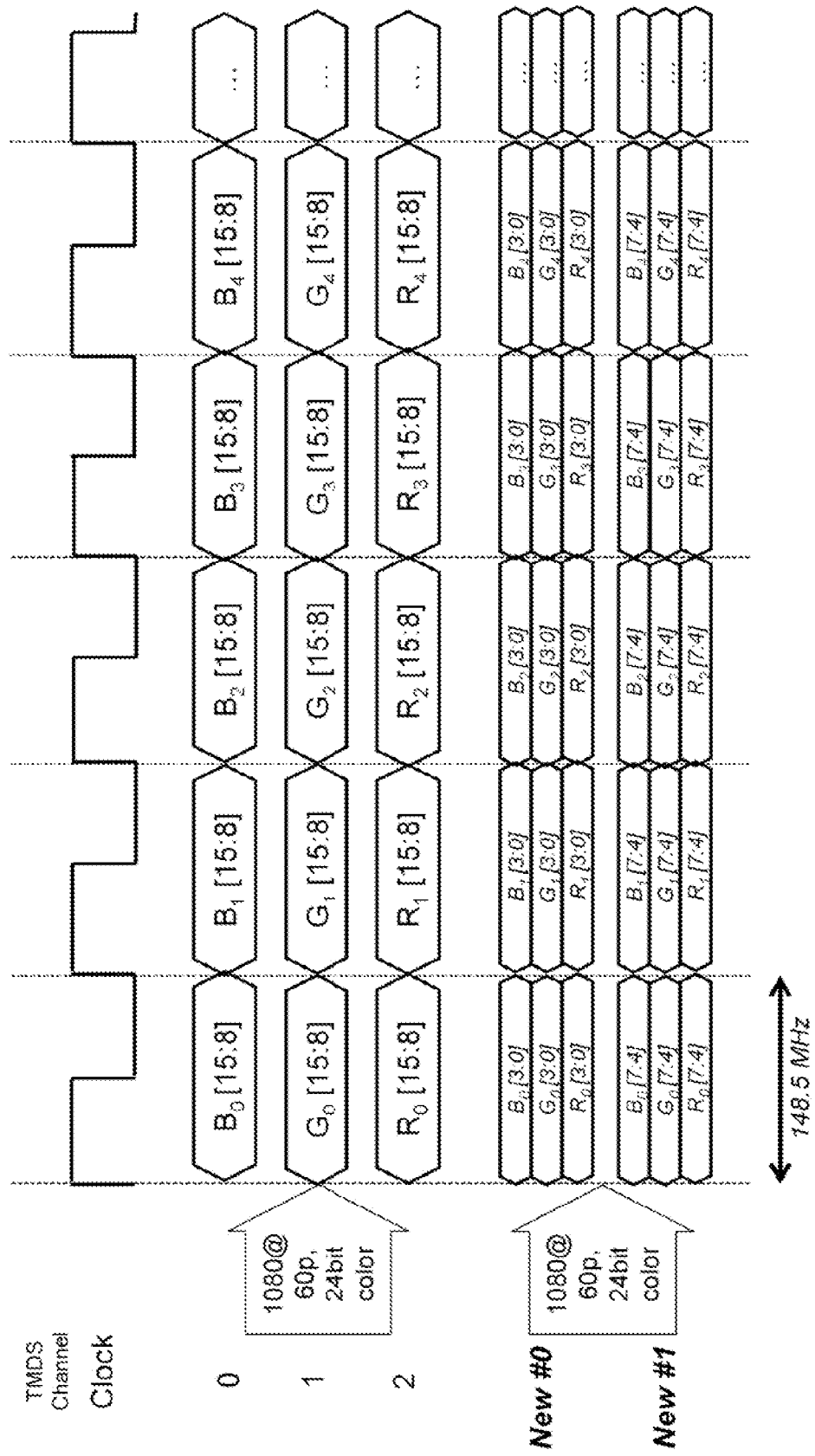

FIG. 25

EDID EXAMPLE

| Byte # | 7 | 6 | 5 | 4 | 3 | 2 | 1 | 0 |
|---|---|---|---|---|---|---|---|---|
| | Rsvd (0) | Rsvd (0) | Rsvd (0) | Rsvd (0) | Rsvd (0) | New Rx Sink | New Cable | Rsvd (0) |

NEW HDMI CABLE EXAMPLE

EXAMPLE OF EDID DATA REWRITING
CIRCUIT OF LSI IN CABLE

FIG. 39
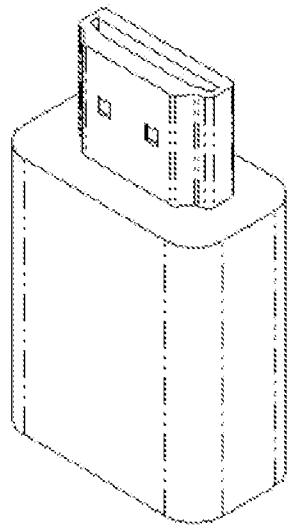
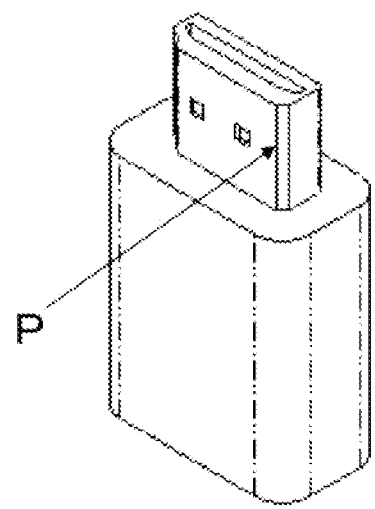

TRANSMITTING DEVICE, TRANSMITTING METHOD, AND RECEIVING DEVICE

CROSS-REFERENCE TO RELATED APPLICATION

The present application is a national phase entry under 35 U.S.C. §371 of International Application No. PCT/JP2012/076051 filed Oct. 5, 2012, published on Apr. 25, 2013 as WO 2013/058133 A1, which claims priority from Japanese Patent Application No. JP 2011-228370 filed in the Japanese Patent Office on Oct. 17, 2011.

TECHNICAL FIELD

The present technique relates to transmitting devices, transmitting methods, and receiving devices, in particular, to transmitting devices and others that transmit video data by differential signals via transmission paths.

BACKGROUND ART

In recent years, HDMI (high definition multimedia interface) has been widely used as a digital interface connecting CE (consumer electronics) devices, and has been a de facto standard in the technical field. For example, Non-Patent Document 1 describes HDMI standards. Under the HDMI standards, three data differential line pairs (TMDS channels 0 to 2) are used to transmit video, audio, and control signals as digital signals.

CITATION LIST

Non-Patent Document

NON-PATENT DOCUMENT 1: High-Definition Multimedia Interface Specification Version 1.3a, Nov. 10, 2006

SUMMARY OF THE INVENTION

Problems to be Solved by the Invention

Currently, the value of transfer rate of the digital signals decided under the HDMI standards is about 10.2 Gbps. However, the bandwidth is not sufficient to support transmission of high-definition 3D (three dimension) video data and high-quality content video data such as 4k2k (QFHD).

However, if the transmit speed is doubled to increase the bandwidth twice, the data rate of each of the channels becomes about 6.8 Gbps. Handling transmission of such high-frequency differential signals puts a significant burden upon designers. Further, taking into account the attenuation of high-frequency components in a cable, there is the possibility that the cable length is excessively shortened, thereby decreasing user operability.

In addition, the existing HDMI standards define only transmission of one data in one direction. In recent years, there have been suggested techniques for supporting a home network in which a user can enjoy AV (audio and visual) contents across rooms. However, such applications cannot be realized by the existing HDMI connection.

An object of the present technique is to increase a transmission bandwidth for video data. Another object of the present technique is to support new applications for inter-room transmission.

Solutions to Problems

The concept of the present technique resides in a transmitting device including: an encoding unit that encodes transmission video data so as to be DC-free and capable of clock regeneration to obtain encoded video data; and a video data transmitting unit that transmits the encoded video data obtained at the encoding unit by a differential signal to an external device via a pair of AC-coupled lines as a transmission path.

According to the present technique, the encoding unit encodes the transmission video data so as to be DC-free and capable of clock regeneration, thereby to obtain the encoded video data. Then, the video data transmitting unit transmits the encoded video data by the differential signal to the external device via the pair of AC-coupled lines as the transmission path. For example, the encoding unit encodes 4-bit data each of red data, green data, and blue data constituting the transmission video data to 5-bit data so as to be DC-free and capable of clock regeneration. Then, the video data transmitting unit transmits 15-bit data composed of the DC-free and clock regenerable 5-bit data each of red data, green data, and blue data.

As in the foregoing, the present technique is configured to transmit to an external device the video data encoded so as to be DC-free and capable of clock regeneration, via the pair of lines as the AC-coupled transmission path. Accordingly, it is possible to increase the transmission bandwidth of video data while improving signal quality and reducing power consumption.

The present technique, for example, may be configured to further include a command signal communication unit that communicates an in-phase command signal to the external device via a pair of lines. In this case, the command signal communication unit is intended to communicate an in-phase command signal via a pair of lines, and even if video data is transmitted to the external device via the pair of lines, the command signal communication unit can favorably communicate the command signal.

The present technique, for example, may be configured to further include a transmission request transmitting unit that, prior to starting of transmission of the encoded video data, transmits a transmission request by a differential signal to the external device via the pair of lines. The transmission request includes at least information of a clock frequency, for example. In this case, the external device can prepare for reception of the encoded video data in response to the transmission request. For example, based on the information of a clock frequency, a PLL circuit for clock regeneration can be set in a state corresponding to the clock frequency so that the lock state can be reached quickly and smoothly.

In the present technique, for example, the video signal transmitting unit may be configured to, prior to starting of transmission of the encoded video data, transmit random data not containing a video timing to the external device via the pair of lines; and transmit the encoded video data by a differential signal to the external device via the pair of lines after the command signal communication unit receives from the external device a command signal indicating that the clock information is capable of being extracted. In this case, the transmission of the encoded video data is started after the extraction of the clock information is allowed at the external device, which makes it possible to favorably transmit the encoded video data to the external device.

The present technique, for example, may be configured to further include: a video data receiving unit that receives by a differential signal the video data encoded so as to be DC-free and capable of clock regeneration from the external device via the pair of lines as the AC-coupled transmission path; and a decoding unit that decodes the encoded video data received at the video data receiving unit to obtain reception video data.

In this case, it is possible to not only transmit video data to the external device but also receive video data from the external device and support new applications for inter-room transmission and the like.

Another concept of the present technique resides in a receiving device including: a video data receiving unit that receives by a differential signal encoded video data encoded so as to be DC-free and capable of clock regeneration from the external device via a pair of lines as an AC-coupled transmission path, and a decoding unit that decodes the encoded video data received at the video data receiving unit to obtain the reception video data.

In the present technique, the receiving unit receives by a differential signal the video data encoded so as to be DC-free and capable of clock regeneration via the pair of lines as the AC-coupled transmission path. Then, the decoding unit decodes the encoded video data to obtain the reception video data.

As in the foregoing, the present technique is intended to receive the encoded video data encoded so as to be DC-free and capable of clock regeneration from the external device via the pair of lines as the AC-coupled transmission path. Accordingly, it is possible to increase the transmission bandwidth of video data while improving signal quality and reducing power consumption.

Another concept of the present technique resides in a transmitting device including: a first video data transmitting unit that transmits first video data to an external device via a DC-coupled differential signal line constituting a transmission path; a second video data transmitting unit that transmits second video data related to the first video data or independent from the first video data, to the external device via the AC-coupled differential signal line constituting the transmission path; and a control unit that controls operations of the first video transmitting unit and the second video data transmitting unit.

In the present technique, the first video data transmitting unit and the second video data transmitting unit are included. The first video data transmitting unit transmits the first video data to the external device via the DC-coupled differential signal line constituting the transmission path. The second video data transmitting unit transmits to the external device the second video data related to the first video data or independent from the first video data via the AC-coupled differential signal line constituting the transmission path.

As in the foregoing, in the present technique, besides the first video data transmitting unit, the second video data transmitting unit is included. The second video data transmitting unit transmits the video data encoded so as to be DC-free and capable of clock regeneration to the external device via the pair of AC-coupled lines as the transmission path. Accordingly, it is possible to increase the transmission bandwidth of video data while improving signal quality and reducing power consumption.

In the present technique, for example, the control unit may be configured to, when the second video data transmitting unit is not used, ground the AC-coupled differential signal line. In this case, when the external device and the transmission path accept only the first video data transmitting unit, it is possible to assure compatibility.

In the present technique, for example, the control unit may be configured to control operations of the second video data transmitting unit, depending on whether the external device accepts the second video data transmitting unit and whether the transmission path accepts the second video data transmitting unit. In this case, only when the external device and the transmission path accept the second video data transmitting unit, the transmission of the video data takes place using the second video data transmitting unit, which makes it possible to avoid transmission of incorrect video data to the external device.

For example, the control unit may be configured to determine whether the external device accepts the second video data transmitting unit, based on capability information of the external device read from the external device via the transmission path. In addition, for example, the control unit may be configured to determine whether the transmission path accepts the second video data transmitting unit using information provision function of the transmission path. For example, the transmission path is a cable, and the control unit may be configured to determine whether the transmission path accepts the second video data transmitting unit by applying a predetermined voltage to a predetermined pin of a receptacle for connecting a plug of the cable.

The present technique, for example, may be configured to further include a frame division processing unit that divides the transmission video data into frames to obtain a plurality of divided vide data, wherein the first video data transmitting unit transmits some of the plurality of divided video data to the external device, and the second video data transmitting unit transmits some of the remaining of the plurality of divided video data to the external device. In this case, the plurality of divided video data obtained by dividing the transmission video data is transmitted to the external device through cooperation between the first video data transmitting unit and the second video data transmitting unit. Accordingly, it is possible to easily transmit video data of high-quality contents such as 4K2K (QFHD) to the external device.

The present technique, for example, may be configured to further include a pixel data division processing unit that halves each pixel data of the transmission video data into an upper bit side and a lower bit side, wherein the first video data transmitting unit transmits the upper bit-side data of each pixel data to the external device, and the second video data transmitting unit transmits the lower bit-side data to the external device. In this case, the upper bit-side data and the lower bit-side data obtained by halving each pixel data of the transmission video data into the upper bit side and the lower bit side are transmitted to the external device through cooperation between the first video data transmitting unit and the second video data transmitting unit. Accordingly, it is possible to easily transmit video data of high-quality contents such as deep-color video data to the external device.

In the present technique, for example, the first video data transmitting unit may be configured to transmit one of left-eye video data and right-eye video data to the external device, and the second video data transmitting unit may be configured to transmit the other of the left-eye video data and the right-eye video data to the external device. In this case, the left-eye image data and the right-eye image data are transmitted to the external device through cooperation between the first video data transmitting unit and the second video data transmitting unit. Accordingly, it is possible to easily transmit video data of high-quality contents such as high-definition 3D video data to the external device.

In this arrangement, for example, the first video data transmitting unit and the second video data transmitting unit may be configured to transmit the divided video data in each frame together with first information indicating the presence of another divided video data to be connected and second information for synchronization with the other divided video data to be connected. For example, the second information may include time code information and arrangement information indicating the arrangement sequence of the video data in the plurality of frames with the time codes indicated by the time code information. In this case, it is possible to easily obtain at the external device the reception video data with the plurality of divided video data arranged in frames.

The present technique, for example, may be configured to further include a video data receiving unit that receives video data from the external device via an AC-coupled differential signal line, wherein the control unit controls, besides operations of the first video data transmitting unit and the second video data transmitting unit, operations of the video data receiving unit. In this case, it is possible to not only transmit video data to the external device but also receive video data from the external device and support new applications for inter-room transmission and the like.

Another concept of the present technique resides in a receiving device including: a first video data receiving unit that receives first video data from the external device via DC-coupled differential signal lines constituting a transmission path; a second video data receiving unit that receives second video data related to the first video data or independent from the first video data via AC-coupled differential signal lines constituting a transmission path; and a control unit that controls operations of the first video data receiving unit and the second video data receiving unit.

In the present technique, the first video data receiving unit and the second video data transmitting unit are included. The first video data receiving unit receives the first video data from the external device via the DC-coupled differential signal line constituting the transmission path. The second video data receiving unit receives from the external device the second video data related to the first video data or independent form the first video data via the AC-coupled differential signal lines constituting the transmission path.

As in the foregoing, in the present technique, the second video data receiving unit is included besides the first video data receiving unit. The second video data receiving unit receives from the external device the video data encoded so as to be DC-free and capable of clock regeneration, via the pair of lines as the AC-coupled transmission paths. Accordingly, it is possible to increase the transmission bandwidth of video data while improving signal quality and reducing power consumption.

Effects of the Invention

According to the technique, it is possible to increase the transmission bandwidth of video data.

BRIEF DESCRIPTION OF DRAWINGS

FIG. 2 is a diagram of an example of combinations of source devices, cables, and sink devices.

FIG. 10 is a diagram illustrating a comparison between conventional HDMI pin configuration (type A) and new HDMI pin configuration.

FIG. 11 illustrates diagrams illustrating pin alignments of receptacles in the conventional HDMI device and the new HDMI device.

FIG. 16 illustrates diagrams of examples of UI screens displayed on a display unit (display) under control of the control unit in the source device.

FIG. 20 is a diagram of an example of a structure of packet (VSIF packet) in HDMI Vendor Specific InfoFrame.

FIG. 21 is a diagram of an example of video data transmission (transmission example 2: full-HD, 60-Hz, 16-bit deep color video data transmission) in the AV system.

FIG. 25 is a diagram of an example of flag information newly defined on an EDID.

FIG. 39 is a perspective view of a conventional HDMI cable plug and a new HDMI cable plug.

MODES FOR CARRYING OUT THE INVENTION

A mode for carrying out the present invention (hereinafter, referred to as "embodiment") will be described below. The description will be given in the following order.
1. Embodiment
2. Modification example
<1. Embodiment>
[Configuration Example of AV System]

Figure 1:
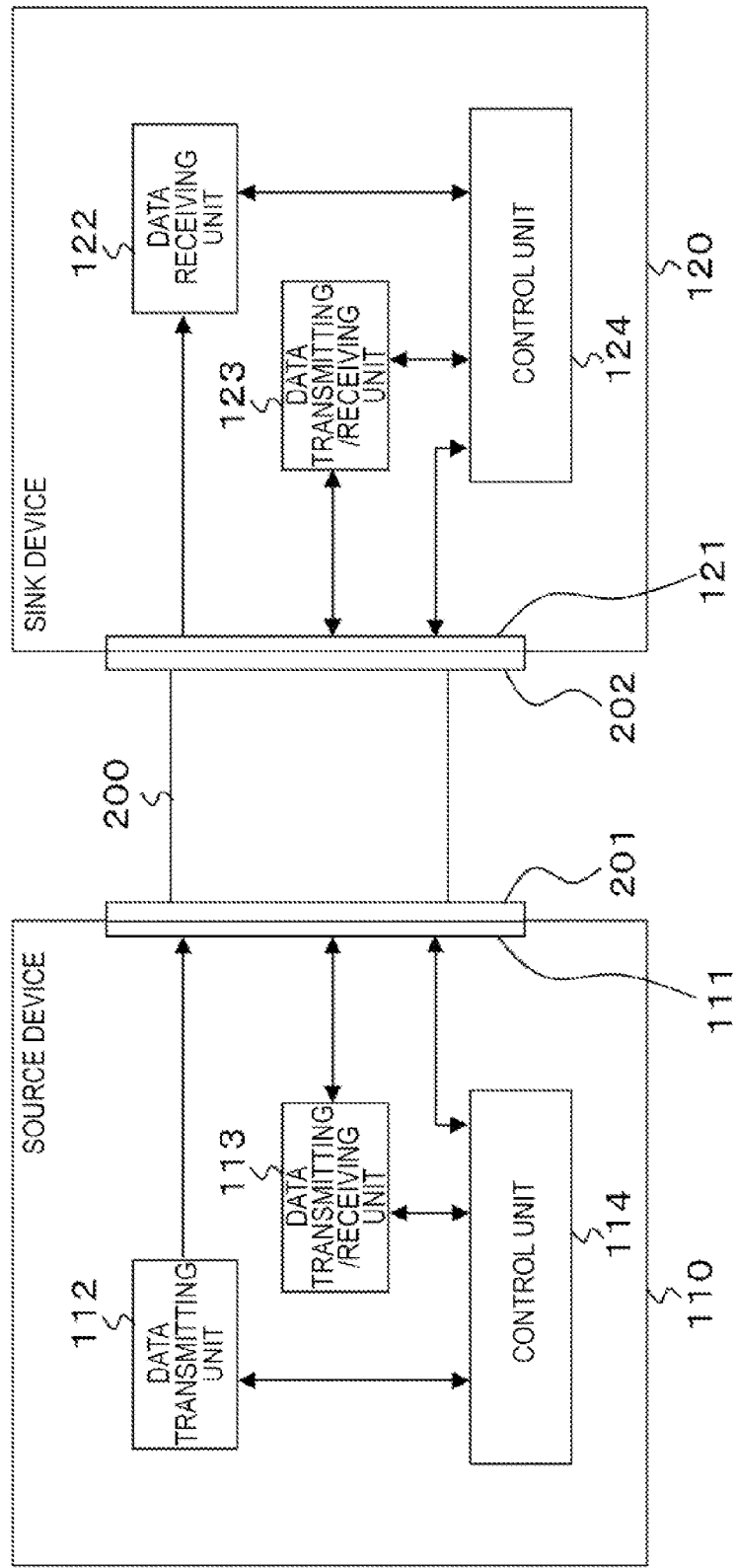
FIG. 1 is a block diagram of an example of a configuration of an AV system as an embodiment.

FIG. 1 illustrates an example of a configuration of an AV (audio and visual) system 10 as an embodiment. The AV system 10 is formed by connecting a source device 110 with a sink device 120. The source device 110 is an AV source such as a game machine, a disc player, a set-top box, a digital camera, or a cellular phone, for example. The sink device 120 is a television receiver, a projector, or the like, for example.

The source device 110 and the sink device 120 are connected together via a cable 200. The source device 110 is provided with a receptacle 111 constituting a connector to which a data transmitting unit 112 and a data transmitting/receiving unit 113 are connected. The sink device 120 is provided with a receptacle 121 constituting a connector to which a data receiving unit 122 and a data transmitting/receiving unit 123 are connected. A plug 201 constituting a connector is provided at one end of the cable 200, and a plug 202 constituting a connector is provided at the other end of the cable 200. The plug 201 at the one end of the cable 200 is connected to the receptacle 111 of the source device 110, and the plug 202 at the other end of the cable 200 is connected to the receptacle 121 of the sink device 120.

The source device 110 has a control unit 114. The control unit 114 controls the entire source device 110. The data transmitting unit 112 of the source device 110 corresponds to a conventional HDMI transmitting unit. The data transmitting/receiving unit 113 of the source device 110 corresponds to both of new HDMI transmitting unit and receiving unit. The source device 110 has the data transmitting/receiving unit 113 to constitute the new HDMI device. The control unit 114 controls operations of the data transmitting/receiving unit 113 based on whether the cable and the sink device support the transmission and reception of video data by the data transmitting/receiving unit 113.

The sink device 120 has a control unit 124. The control unit 124 controls the entire sink device 120. The data receiving unit 122 of the sink device 120 corresponds to a conventional HDMI receiving unit. The data transmitting/receiving unit 123 of the sink device 120 corresponds to both of new HDMI receiving unit and transmitting unit. The sink device 120 has the data transmitting/receiving unit 123 to constitute the new HDMI device. The control unit 124 controls operations of the data transmitting/receiving unit 123 based on whether the cable and the source device support the transmission and reception of video data by the data transmitting/receiving unit 123.

Configurations of the data transmitting unit 112 and the data transmitting/receiving unit 113 of the source device 110 and configurations of the data receiving unit 122 and the data transmitting/receiving unit 123 of the sink device 120 will be described later in detail. The cable 200 is a cable accepting new HDMI devices (hereinafter, referred as appropriate to as "new HDMI cable"). The details of a configuration of the cable 200 will also be descried later.

In FIG. 2(a), the configuration of "Case 1" is the same as that of the AV system 10 illustrated in FIG. 1. A source device and a sink device constitute new HDMI devices and are connected together via a new HDMI cable. In this case, transmission of video data can be performed between the data transmitting/receiving unit 113 of the source device 110 and the data transmitting/receiving unit 123 of the sink device 120 (hereinafter, referred as appropriate as to "video data transmission using the new HDMI function").

In FIG. 2(b), "Case 2" is configured such that the source device is a new HDMI device and the sink device is a conventional HDMI device, and the two are connected together via a new HDMI cable. In this case, no video data transmission is performed using the new HDMI function. In this case, a new data line pair for video data transmission using the new HDMI function is dropped to a grounding level at the source device side, whereby conventional HDMI connection is realized to secure connection in the conventional HDMI.

In FIG. 2(c), "Case 3" is configured such that the source device is a new HDMI device and the sink device is a conventional HDMI device, and the two are connected together via a conventional HDMI cable. In this case, as in "Case 2", a new data line pair for video data transmission using the new HDMI function is dropped to a grounding level at the source device side, whereby conventional HDMI connection is realized to secure connection in the conventional HDMI.

In FIG. 2(d), "Case 4" is configured such that the source device is a conventional HDMI device and the sink device is a conventional HDMI device, and the two are connected together via a new HDMI cable. In this case, a new data line pair for video data transmission using the new HDMI function is dropped to a grounding level at both of the source device side and the sink device side, whereby the configuration is the same as the configuration of the conventional HDMI to secure connection in the conventional HDMI.

[Example Of Configurations Of The Data Transmitting Unit of the Source Device and the Data Receiving Unit of the Sink Device]

Figure 3:
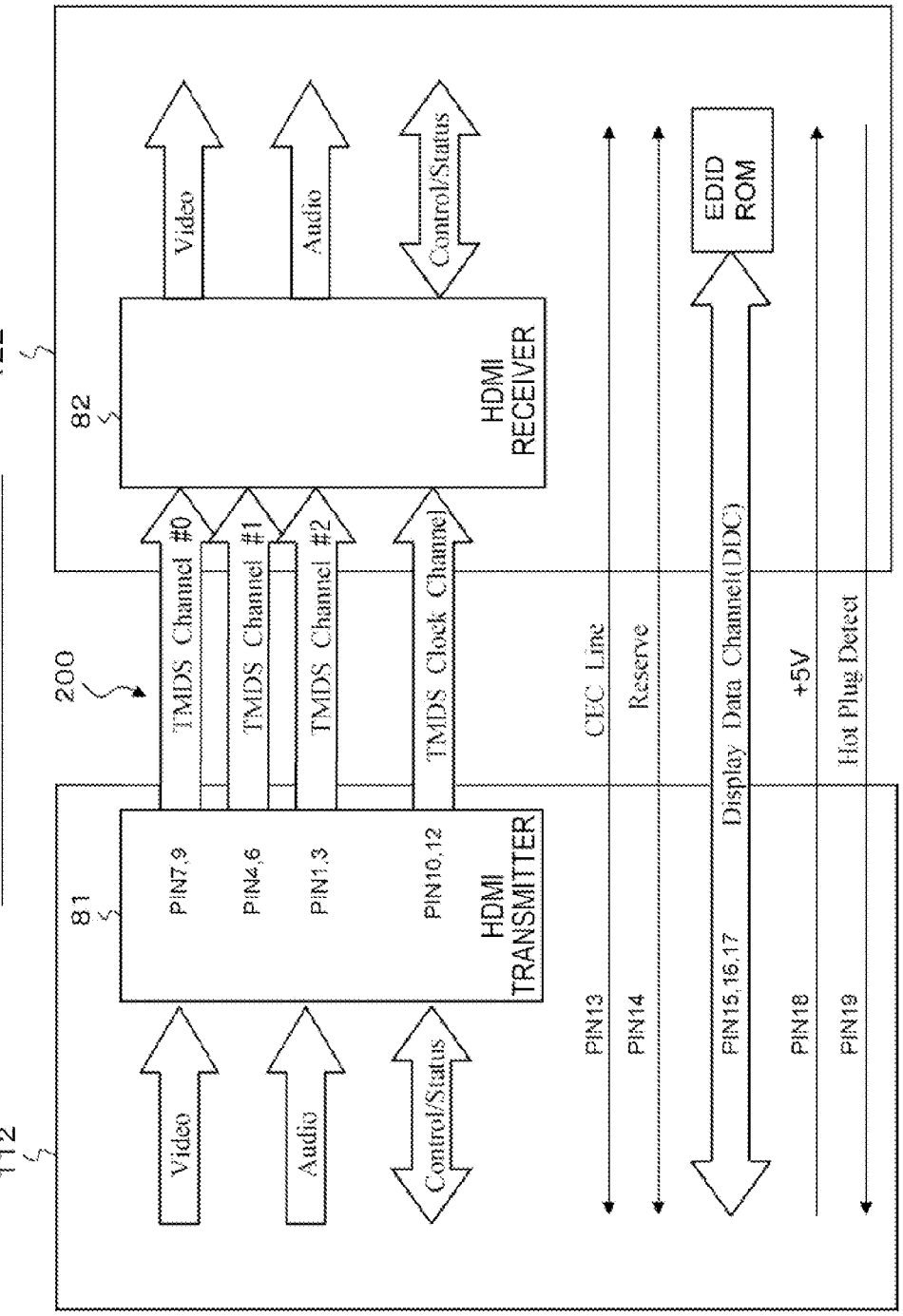
FIG. 3 is a diagram of an example of a configuration of a data receiving unit of a source device and a data receiving unit of a sink device constituting a conventional HDMI transmission system.

FIG. 3 illustrates an example of configurations of the data transmitting unit 112 of the source device 110 and the data receiving unit 122 of the sink device 120 in the AV system 10 illustrated in FIG. 1. The data transmitting unit 112 transmits TMDS transmission data by a differential signal to the data receiving unit 122 in one direction.

In this case, the data transmitting unit 112 transmits a differential signal corresponding to one screen of uncompressed video data in an effective image period (also called "active video period"). The effective image period here refers to a period obtained by subtracting a horizontal retrace period and a vertical retrace period from a period ranging from one vertical synchronization signal to the next vertical synchronization signal. The data transmitting unit 112 also transmits differential signals corresponding to audio data and control data, other auxiliary data, and the like accompanying the video data.

The data receiving unit 122 receives TMDS transmission data by a differential signal from the data transmitting unit 112 in one direction. In this case, the data receiving unit 122 receives a differential signal corresponding to one screen of uncompressed video data in the effective image period. The data receiving unit 122 also receives differential signals corresponding to audio data and control data accompanying the video data in the horizontal retrace period or the vertical retrace period.

There are transmission channels described below in the transmission system including the data transmitting unit 112 and the data receiving unit 122. First, the transmission channels include differential signal channels (TMDS channels and a TMDS clock channel). Specifically, as illustrated in FIG. 3, there are three TMDS channels #0 to #2 as transmission channels that transmit serially video data and audio data in one direction from the data transmitting unit 112 to the data receiving unit 122 in synchronization with a pixel clock. In addition, there is a TMDS clock channel as a transmission channel for transmitting a TMDS clock.

For example, the data transmitting unit 112 has an HDMI transmitter 81 that converts uncompressed video data to a corresponding differential signal, and transmits serially the signal in one direction to the data receiving unit 122 connected via the cable 200 over the three TMDS channels #0, #1, and #2. The HDMI transmitter 81 also converts audio data, required control data, and other auxiliary data, and the like accompanying the uncompressed video data to corresponding differential signals, and transmits serially the signals in one direction to the data receiving unit 122 over the three TMDS channels #0, #1, and #2.

Further, the HDMI transmitter 81 transmits a TMDS clock in synchronization with the video data transmitted over the three TMDS channels #0, #1, and #2, to the data receiving unit 122. Here, over each of the TMDS channels #i (i=0, 1, and 2), 10-bit video data is transmitted during one clock of the TMDS clock.

The data receiving unit 122 has an HDMI receiver 82 that receives a differential signal corresponding to the video data and differential signals corresponding to the audio data and the control data transmitted in one direction from the data transmitting unit 112 over the TMDS channels #0, #1, and #2. In this case, the HDMI receiver 82 receives the differential signals in synchronization with the pixel clock (TMDS clock) transmitted from the data transmitting unit 112 over the TMDS clock channel.

Transmission channels in the HDMI system also include transmission channels called DDC (display data channel) and CEC (consumer electronics control) lines. The DDC is composed of two signal lines not illustrated in the cable 200. The DDC is used for the data transmitting unit 112 to read E-EDID (enhanced extended display identification data) from the data receiving unit 122.

That is, the data receiving unit 122 has, besides the HDMI receiver 82, an EDID ROM (EEPROM) that stores E-EDID as capability information on its own capability (configuration/capability). The data transmitting unit 112, in response to a request from the control unit 114, reads the E-EDID via the DDC from the data receiving unit 122 connected via the cable 200, for example.

The data transmitting unit 112 sends the read E-EDID to the control unit 114. The control unit 114 stores the E-EDID in a flash ROM or DRAM not illustrated. The control unit 114 can recognize the capability of the sink device 120 based on the E-EDID. For example, the control unit 114 recognizes whether the sink device 120 supports video data transmission using the new HDMI function.

The CEC line is composed of one signal line not illustrated in the HDMI cable and is used to perform bi-directional communications of control data between the data transmitting unit 112 and the data receiving unit 122. The CEC line constitutes a control data line.

The HDMI cable also includes a line (HPD Line) connected to a pin called HPD (Hot Plug Detect). The source device can use the HPD line to detect connection of the sink device. The HDMI cable also includes a power line (+5VPower Line) used to supply power from the source device to the sink device. Further, the HDMI cable includes a reserve line (Reserve).

The HDMI transmitter 81 of the data transmitting unit 112 and the HDMI receiver 82 of the data receiving unit 122 illustrated in FIG. 3 are DC-coupled to a pair of lines relating to the TMDS channels and the TMDS clock channel and constituting the cable 200.

Figure 4:
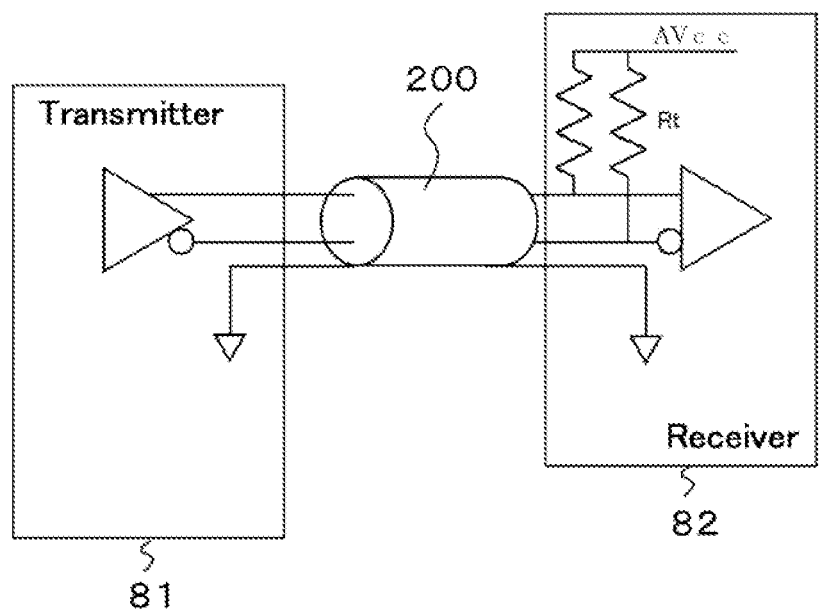
FIG. 4 is a schematic view of a differential data pair in the conventional HDMI transmission system.

FIG. 4 illustrates a schematic view of differential signal lines (data line pairs) in the conventional HDMI transmission system. Transmission is performed in a so-called DC-coupled manner such that a bias voltage is applied to the transmission line at the HDMI receiver 82 side to connect the HDMI receiver 82 directly to the HDMI transmitter 81 not via capacitors. The DC coupling has an advantage of suppressing deterioration in signal quality due to a DC component in a serial signal. Meanwhile, the DC coupling has the disadvantage as described below. That is, the DC coupling requires the use of a driver/receiver for the transmission line with a high voltage resistance, which makes it difficult to decrease power consumption and reduce the size of a circuit with progress of a LSI (large scale integration) process. In addition, the DC coupling makes in-phase noise prone to be placed in a bias level. Further, the DC coupling makes attenuation of signals prone to take place due to long-distance transmission.

Figure 5:
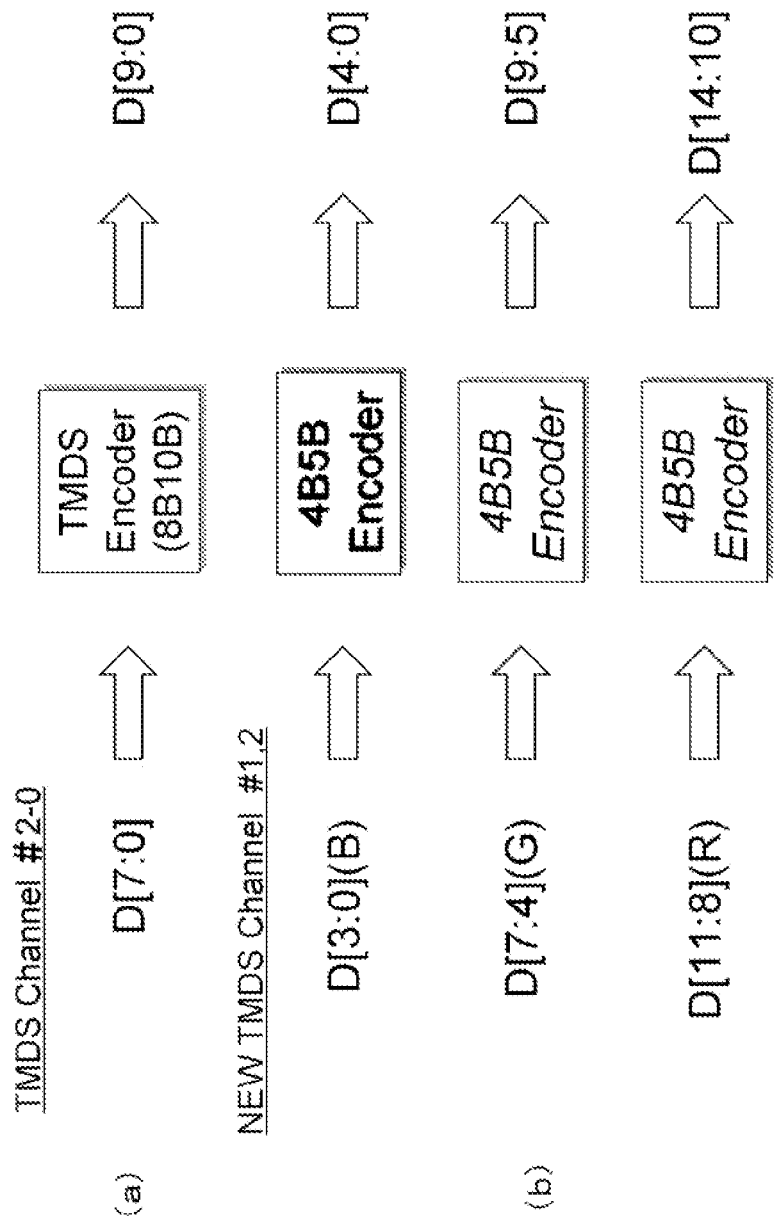
FIG. 5 is diagrams illustrating coding (TMDS coding) of video data in the conventional HDMI transmission system and a new HDMI transmission system.

FIG. 5(a) illustrates coding (TMDS coding) of video data of respective colors transmitted over the TMDS channels #0, #1, and #2. In this case, 8-bit data is converted to DC-free 10-bit data. Converting to DC-free encoded video data as described above makes it possible to prevent deterioration of serial data.

[Example of Configurations of Data Transmitting/Receiving Units of a Source Device and a Sink Device]

Figure 6:
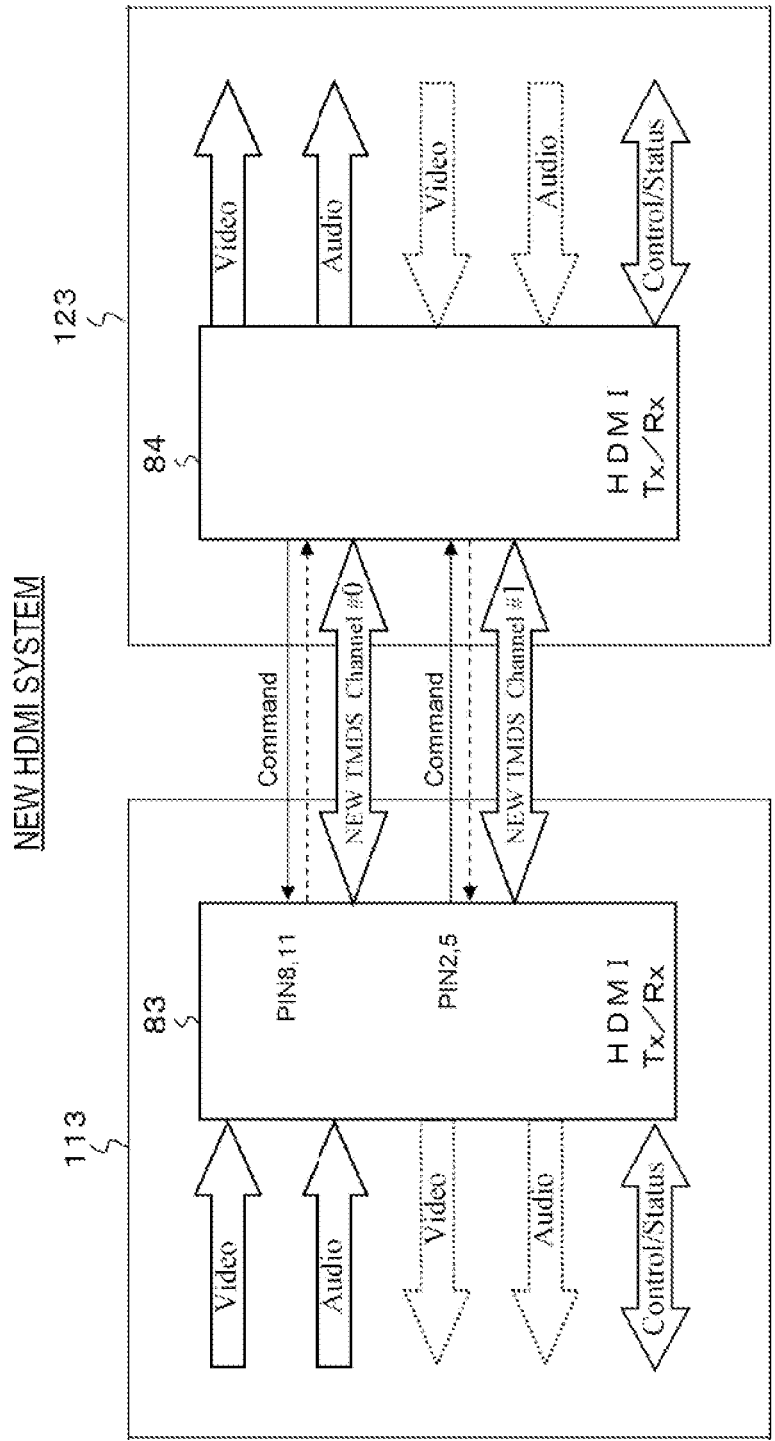
FIG. 6 is a diagram of an example of a configuration of a data transmitting/receiving unit of a source device and a data transmitting/receiving unit of a sink device constituting the new HDMI transmission system.

FIG. 6 illustrates an example of configurations of the data transmitting/receiving unit 113 of the source device 110 and the data transmitting/receiving unit 123 of the sink device 120 in the AV system 10 illustrated in FIG. 1. On data transmission, the data transmitting/receiving unit 113 transmits TMDS transmission data by a differential signal to the data transmitting/receiving unit 123. On data reception, the data transmitting/receiving unit 113 receives TMDS transmission data by a differential signal from the data transmitting/receiving unit 123. In this case, the data transmitting/receiving unit 113 transmits/receives the differential signals corresponding to one screen of uncompressed video data in the effective image period.

Similarly, on data transmission, the data transmitting/receiving unit 123 transmits TMDS transmission data by a differential signal to the data transmitting/receiving unit 113. On data reception, the data transmitting/receiving unit 123 receives TMDS transmission data by a differential signal from the data transmitting/receiving unit 113. In this case, the data transmitting/receiving unit 123 transmits/receives the differential signals corresponding to one screen of uncompressed video data in the effective image period.

There are transmission channels described below in the transmission system including the data transmitting/receiving unit 113 and the data transmitting/receiving unit 123. Specifically, the transmission channels include differential signal channels (TMDS channels). That is, as illustrated in FIG. 6, there are two new TMDS channels #0 and #1. The new TMDS channels #0 and #1 transmit video data and audio data in synchronization with a pixel clock in two directions between the data transmitting/receiving unit 113 and the data transmitting/receiving unit 123.

Transmission of TMDS clocks is omitted between the data transmitting/receiving unit 113 and the data transmitting/receiving unit 123. At the reception side, a self-clock system is employed to regenerate a clock from received data. In this arrangement, over the new TMDS channels #i (i=0 and 1), 15-bit video data (encoded video data) is transmitted during one clock of the TMDS clock. That is, by dividing the data transmission clock of the video data into 15, it is possible to generate a pixel clock. By employing the self-clock system, the two new TMDS channels exist completely independently from the TMDS channels #i (i=0, 1, and 2). Accordingly, it is possible to not only eliminate the influence of a data skew from the conventional HDMI line but also transmit data independently even between the two new TMDS channels.

The data transmitting/receiving unit 113 has an HDMI transmitting/receiving unit 83 that converts uncompressed video data to a corresponding differential signal, and transmits serially the signal to the data transmitting/receiving unit 123 connected via the cable 200 over either or both of the new TMDS channels #0 and #1. At that time, the HDMI transmitting/receiving unit 83 converts audio data, required control data, other auxiliary data, and the like accompanying the uncompressed video data, to corresponding signals and transmits serially the signal to the data receiving unit 123 over the channel over which the video data is transmitted.

The HDMI transmitting/receiving unit 83 of the data transmitting/receiving unit 113 also receives the differential signal corresponding to the video data and the differential signals corresponding to the audio data and control data transmitted from the data transmitting/receiving unit 123, over either or both of the new TMDS channels #0 and #1.

Similarly, the data transmitting/receiving unit 123 has an HDMI transmitter/receiver 84 that converts uncompressed video data to a corresponding differential signal, and transmits serially the signal to the data transmitting/receiving unit 113 connected via the cable 200 over either or both of the new TMDS channels #0 and #1. At that time, the HDMI transmitter/receiver 84 converts audio data, required control data, other auxiliary data, and the like accompanying the uncompressed video data, to corresponding signals and transmits serially the signals to the data receiving unit 113 over the channel over which the video data is transmitted.

The HDMI transmitter/receiver 84 of the data transmitting/receiving unit 123 also receives the differential signal corresponding to the video data and the differential signals corresponding to the audio data and control data transmitted from the data transmitting/receiving unit 113, over either or both of the new TMDS channels #0 and #1.

Figure 7:
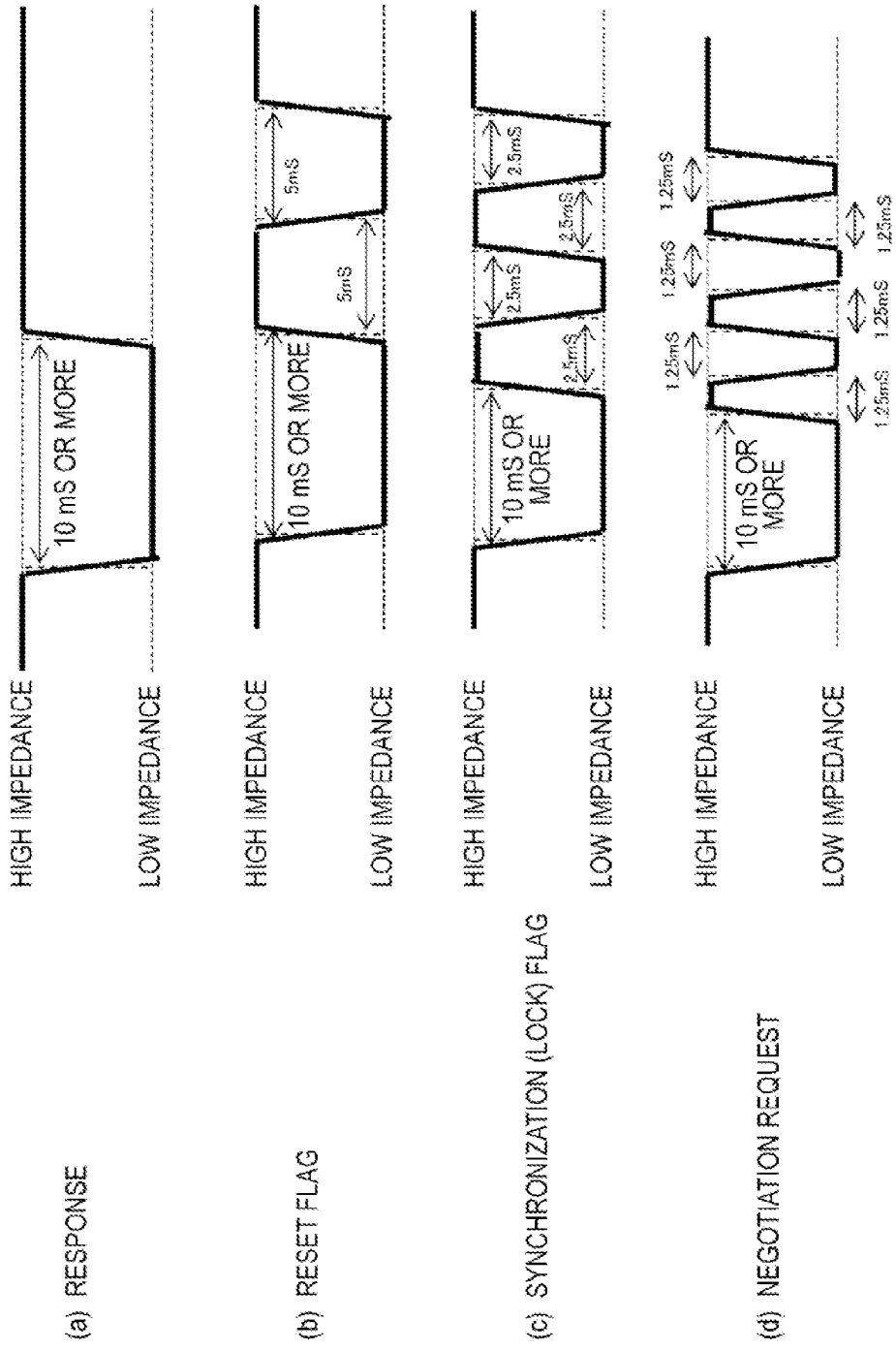
FIG. 7 illustrates diagrams of examples of commands transmitted in phase.

In the transmission system (new HDMI transmission system) including the data transmitting/receiving unit 113 and the data transmitting/receiving unit 123 illustrated in FIG. 6, it is possible to communicate in-phrase command signals between the data transmitting/receiving unit 113 and the data transmitting/receiving unit 123, using the new TMDS channels #0 and #1. FIG. 7 illustrates examples of commands transmitted in an in-phase manner.

FIG. 7(*a*) illustrates a response command. Upon correct reception of an in-phase command, the reception side transmits the response command to the transmission side. FIG. 7(*b*) illustrates a reset flag command. If there arises a situation in which a bus (new TMDS channel) is to be released at the reception side or the transmission side, the reset flag command is transmitted from the side requesting the release of the bus to the side not requesting the release of the bus.

The situation in which the bus is to be released includes a format change in transmission data, for example. For example, the transmission side having received the reset flag command from the reception side immediately stops transmission of the video data to release the used bus (new TMDS channel). In addition, for example, the reception side having received the reset flag command from the transmission side immediately stops display of an image by the video data to release the used bus (new TMDS channel).

FIG. 7(*c*) illustrates a synchronization (lock) flag command. When extraction of clock information from data received at the reception side is enabled, the synchronization flag command is transmitted from the reception side to the transmission side. FIG. 7(*d*) illustrates a negotiation request command. The negotiation request command is a command transmitted from the transmission side to the reception side to perform communication of a transmission request or the like (communication of a differential signal).

In the transmission system including the data transmitting/receiving unit 113 and the data transmitting/receiving unit 123 illustrated in FIG. 6, it is possible to perform the foregoing communication of differential signals between the data transmitting/receiving unit 113 and the data transmitting/receiving unit 123 using new TMDS channels. For the communication of differential signals, as basic settings, one of the new TMDS channels supports communications from the data transmitting/receiving unit 113 to the data transmitting/receiving unit 123, and the other of the new TMDS channels supports communications from the data transmitting/receiving unit 123 to the data transmitting/receiving unit 113.

The negotiation request command is a command necessary to, if one of the two new TMDS channels supporting the transmission direction of the subject side is in used state, change the communication direction of the other unused new TMDS channel to perform differential signal communications.

Both of the in-phase signals are generally not driven but are in high-impedance state. To transmit a command, the transmission side drives the command at a timing illustrated in the diagram after confirming that the bus is not driven for 10 mS or more. The reception side is not to transmit the next command before returning a response. The transmission side may resend the command if there is no receipt of the response. Exchange of commands by in-phase signals is performed such that, when one of the new TMDS channels is being used or is to be used, the commands are exchanged over the new TMDS channel, and when the two are being used or are to be used, the commands are exchanged over both of the new TMDS channels. For example, to transmit video data over the two channels, the transmission is performed after the synchronization (lock) flags from both of the channels are ascertained.

In the transmission system (new HDMI transmission system) including the data transmitting/receiving unit 113 and the data transmitting/receiving unit 123 illustrated in FIG. 6, it is possible to communicate in-phase command signals and differential signals between the data transmitting/receiving unit 113 and the data transmitting/receiving unit 123. Accordingly, it is possible to establish and modify a configuration for transmission of video data, and reset buses (new TMDS channels), and the like, independently from the transmission system (conventional HDMI transmission system) including the data transmitting unit 112 and the data receiving unit 122 illustrated in FIG. 3.

That is, the transmission system including the data transmitting/receiving unit 113 and the data transmitting/receiving unit 123 can operate in synchronization with the transmission system including the data transmitting unit 112 and the data receiving unit 122 or can operate independently from the transmission system. Therefore, it is easy to introduce the transmission system such that the part of the conventional HDMI transmission system uses a conventional HDMI device, the part of the new HDMI transmission system uses a new device, and synchronous cooperation between the two is controlled in the system.

Figure 8:
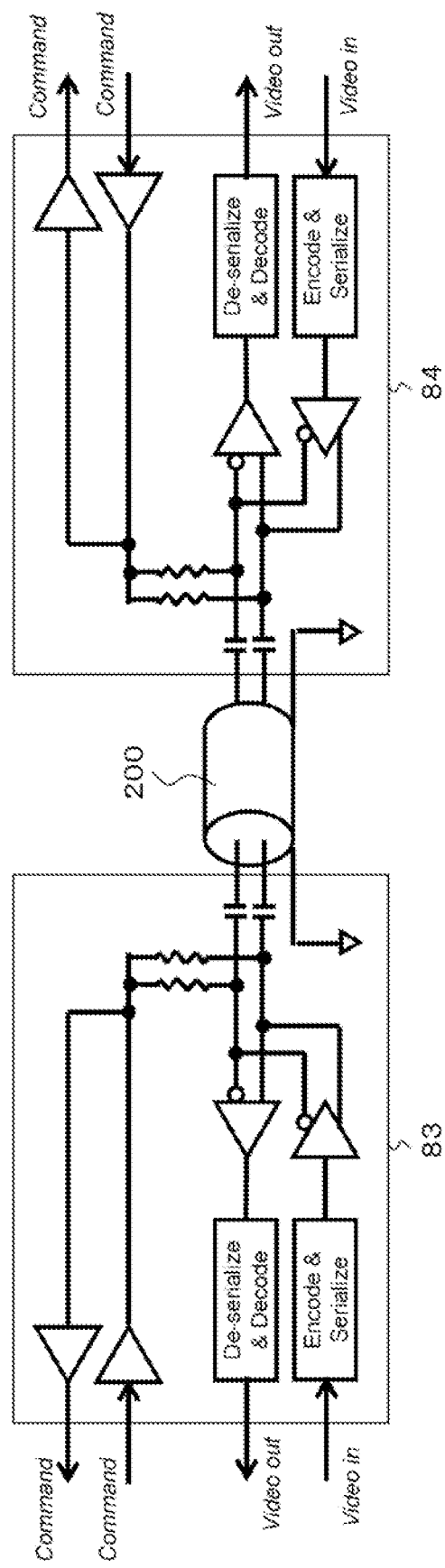
FIG. 8 is a schematic view of differential signal lines (data line pair) in the new DHMI transmission system.

FIG. 8 illustrates a schematic view of differential signal lines (data line pairs) in the new HDMI transmission system. The HDMI transmitting/receiving unit 83 of the data transmitting/receiving unit 113 and the HDMI transmitter/receiver 84 of the data transmitting/receiving unit 123 are connected to the differential signal lines of the cable 200 via capacitors, to perform AC-coupled transmission. The AC coupling eliminates the need to use a high-voltage driver/receiver, which makes it possible to decrease power consumption, reduce the circuit size, and the like. That is, for video data transmission using one differential signal line, using the new TMDS channel makes it possible to achieve operations with lower power consumption even at an increased transmission speed.

FIG. 5(b) illustrates coding (TMDS coding) of video data of respective colors transmitted over the new TMDS channels #i (i=0 and 1). In this case, 4-bit data each of blue (B), green (G), and red (R) is encoded to DC-free and clock regenerable (self-clock type) 5-bit data. The HDMI transmitting/receiving units 83 and 84 transmit 15-bit data composed of 5-bit data each of respective colors obtained by encoding as described above. That is, over the new TMDS channels #i (i=0 and 1), 15-bit video data (encoded video data) is transmitted during one clock of the TMDS clock.

Figure 9:
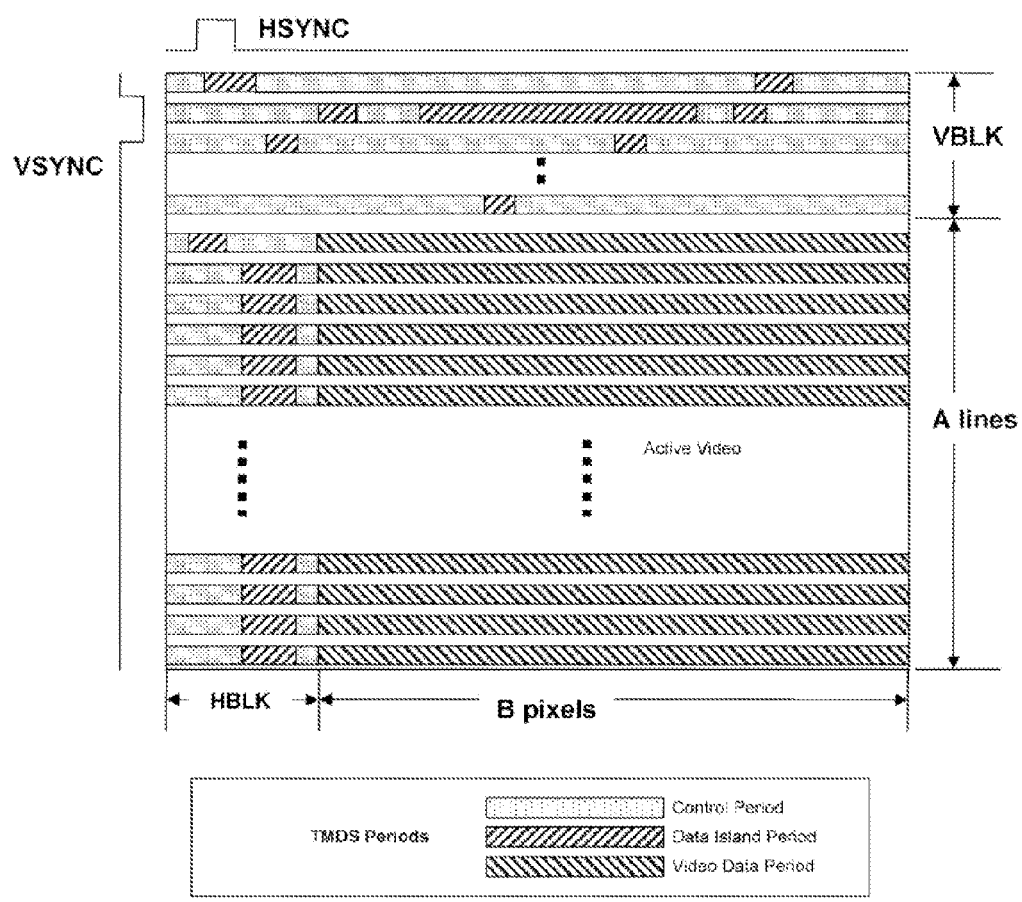
FIG. 9 is a diagram of an example of a structure of TMDS transmission data.

FIG. 9 illustrates an example of a structure of TMDS transmission data. FIG. 9 illustrates various transmission data periods in which video data of B pixels horizontal×A lines vertical is transmitted over two or one of the TMDS channels #0 to #2 or the new TMDS channels #0 and #1. In a video field period in which transmission data is transmitted, there are three periods according to the kinds of transmission data. The three kinds of periods are a video data period, a data island period, and a control period.

The video field period is a period ranging from a rising edge of a vertical synchronization signal (active edge) to a rising edge of the next vertical synchronization signal. The video field period is divided into a horizontal blanking period, a vertical blanking period, and an active video period.

The active video period is a period obtained by removing the horizontal blanking period and the vertical blanking period from the video field period. The video data period is assigned to the active video period. In the video data period, active pixel data of B pixels×A lines constituting one screen of uncompressed image data is transmitted.

The data island period and the control period are assigned to the horizontal blanking period and the vertical blanking period. In the data island period and the control period, auxiliary data is transmitted. That is, the data island period is assigned to some portions of the horizontal blanking period and the vertical blanking period.

In the data island period, of the auxiliary data, data not related to control, for example, packets of audio data and the like are transmitted. The control period is assigned to the other portions of the horizontal blanking period and the vertical blanking period. In the control period, of the auxiliary data, data related to control, for example, a vertical synchronization signal and a horizontal synchronization signal, control packets, and others are transmitted.

Here, pin configurations in the receptacle 111 of the source device 110 as a new HDMI device and the receptacle 121 of the sink device 120 as a HDMI device will be described. The structure of the receptacle of the new HDMI device is the same as the structure of the receptacle of the conventional HDMI device. Accordingly, it is not necessary to provide a connector dedicated to the new HDMI device.

First, referring to FIG. 10(a), the pin configuration (type A) in the receptacle of the conventional HDMI device will be described. Differential signals in the TMDS channels #i (i=0 to 2), TMDS Data#i+ and TMDS Data#i−, are transmitted over a pair of lines (two lines) as differential lines. Pins (with pin numbers 7, 4, and 1) are assigned to TMDS Data#i+, and pins (with pin numbers 9, 6, and 3) are assigned to TMDS Data#i−. Pins with pin numbers 8, 5, and 2 are assigned to TMDS Data#i Shield (i=0 to 2).

Differential signals in the TMDS clock channel, TMDS Clock+ and TMDS Clock−, are transmitted over two differential lines. Pin with pin number 10 is assigned to TMDS Clock+, and pin with pin number 12 is assigned to TMDS Clock−. Pin with pin number 11 is assigned to TMDS Clock Shield.

A CEC signal as control data is transmitted over a CEC line. The pin with pin number 13 is assigned to the CEC signal. An SDA (Serial Data) signal such as E-EDID is transmitted over an SDA line. Pin with pin number 16 is assigned to an SDA signal. An SCL (Serial Clock) signal as a clock signal for use in synchronization at transmission/reception of an SDA signal is transmitted over an SCL line. The pin with pin number 15 is assigned to SCL. The foregoing DDC line is composed of an SDA line and an SCL line.

The pin with pin number 19 is assigned to HPD (Hot Plug Detect). Pin with pin number 14 is assigned to a reserve (Reserve). Pin with pin number 17 is assigned to DDC/CEC Ground. Pin with pin number 18 is assigned to a power source (+5 V Power).

Next, referring to FIG. 10(b), the pin configuration in the receptacle in the new HDMI device will be described. Differential signals in the TMDS channel #i (i=0 to 2), TMDS Data#i+ and TMDS Data#i−, are transmitted over two differential lines. Pins (with pin numbers 1, 4, and 7) are assigned to TMDS Data#i+, and pins (with pin numbers 3, 6, and 9) are assigned to TMDS Data#i−.

Differential signals in the new TMD channel #1 (i=0 and 1), NEW TMDS Data#i+ and NEW TMDS Data#i− are transmitted over a pair of differential line (two lines). Pins with (pin numbers 2 and 8) are assigned to NEW TMDS Data#i+, and pins (with pin numbers 5 and 11) are assigned to NEW TMDS Data#i−.

A CEC signal as control data is transmitted over a CEC line. The pin with pin number 13 is assigned to the CEC signal. An SDA (Serial Data) signal such as E-EDID is transmitted over an SDA line. Pin with pin number 16 is assigned to an SDA signal. An SCL (Serial Clock) signal as a clock signal for use in synchronization at transmission/reception of an SDA signal is transmitted over an SCL line. The pin with pin number 15 is assigned to SCL. The foregoing DDC line is composed of an SDA line and an SCL line.

The pin with pin number 19 is assigned to HPD (Hot Plug Detect). Pin with pin number 14 is assigned to a reserve (Reserve). Pin with pin number 17 is assigned to DDC/CEC Ground. Pin with pin number 18 is assigned to a power source (+5 V Power).

As described above, in the pin configuration of receptacle (refer to FIG. 10(*b*)) of the new HDMI device, terminals (with pin numbers 2, 5, 8, and 11) used as shield terminals in the pin configuration (refer to FIG. 10(*a*)) of the receptacle of the conventional HDMI device are newly used as data terminals.

FIG. 11(*a*) illustrates a pin alignment of the receptacle in the conventional HDMI device. FIG. 11 (*b*) illustrates a pin alignment of the receptacle in the new HDMI device. In the new HDMI device, when the data transmitting/receiving unit constituting the new HDMI transmission system is not used, the pins with pin numbers 2, 5, 8, and 11 are grounded. Accordingly, it is possible to assure compatibility when the devices and transmission path of the other communication party accept the conventional HDMI.

Figure 12:
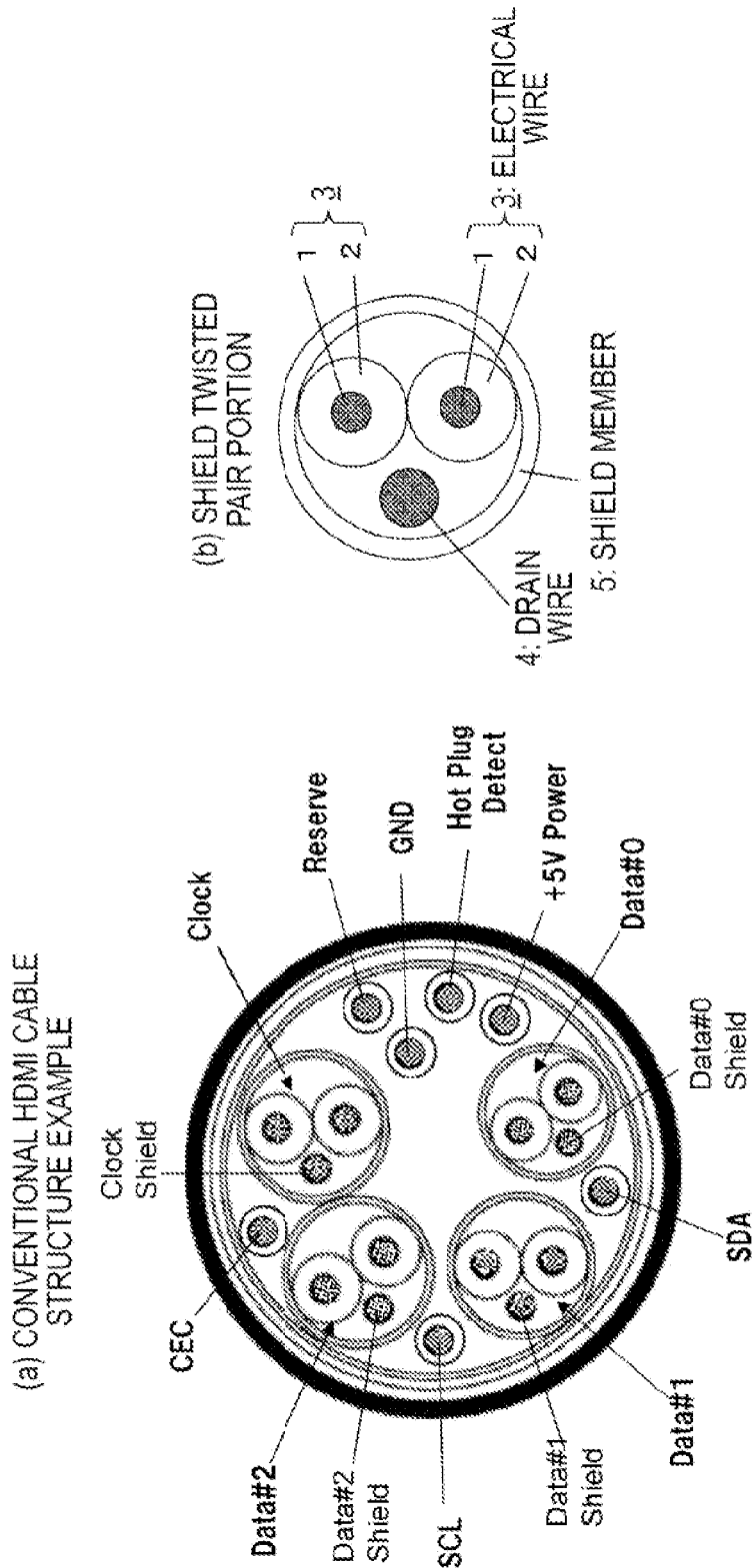
FIG. 12 is a diagram of an example of a structure of a conventional HDMI cable.

FIG. 12(*a*) illustrates an example of a structure of a conventional HDMI cable used as the cable 200. In the conventional HDMI cable, three data line pairs are formed as shield twisted pair portions to obtain respective characteristics. In addition, the clock line pair is also formed as a shield twisted pair portion.

FIG. 12(*b*) illustrates an example of a structure of a shield twisted pair portion. The shield twisted pair portion is structured such that two electric wires 3 and a drain wire 4 are covered with a shield member 5. The electric wires 3 are each formed such that a core wire 1 is covered with a covering portion 2.

In the conventional HDMI cable, the drain wires constituting shield twisted pair portions of data and clock are connected to pins of the plug attached to the end of the cable. In this case, each of the drain wires is connected to a pin (terminal) corresponding to each of the shield terminals (shield pins with pin numbers 2, 5, 8, and 11) of the foregoing receptacle (conventional HDMI pin alignment). These shield terminals are grounded at the source device 110 and the sink device 120. Accordingly, the drain wires constituting the shield twisted pair portions of data and clock are grounded when the plug is connected to the receptacle (existing HDMI pin alignment).

Figure 13:
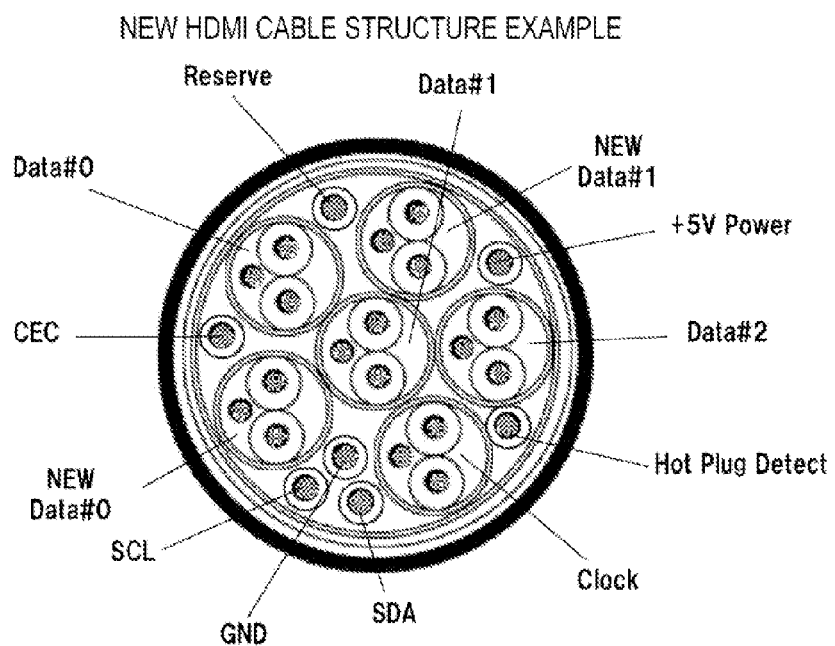
FIG. 13 is a diagram of an example of a structure of a new HDMI cable.

FIG. 13 illustrates an example of a structure of the new HDMI cable used as the cable 200. In the new HDMI cable, six data line pairs are formed as shield twisted pair portions to obtain respective characteristics. Specifically, three data line pairs corresponding to the TMDS channels are formed as shield twisted pair portions to obtain respective characteristics. In addition, the clock line pair corresponding to the TMDS clock channel is also formed as a shield twisted pair portion. Further, two data line pairs corresponding to the new TMDS channels are formed as shield twisted pair portions to obtain respective characteristics.

As compared to the conventional HDMI cable (refer to FIG. 12(*a*)), the new HDMI cable has a larger number of copper wires to be connected. In the new HDMI cable, the drain wires constituting the shield twisted pair portions connected by dedicated pins on the plugs at both ends of the cable are connected to metallic shells of the plugs. Accordingly, the shield pins are released to avoid an increase in the number of required pins on the plugs, and thus the plugs of the new HDMI cable are the same as the plugs of the conventional HDMI cable. The metallic shells are conventionally provided to prevent radiation to the outside and the like, and thus are connected at the grounding level in a device connected at establishment of the connection. This makes no functional difference from the conventional HDMI cable.

As in the foregoing, when the drain wires constituting the shield twisted pair portions are connected to the metallic shells of the plugs, the shells of the receptacles into which the plugs are inserted are connected at the grounding level, which makes it possible to assure shielding of the differential signal lines. In this case, the metallic shells of the plugs at both ends of the cable are short-circuited by the drain wires, and thus the grounding level is shared and set to the same level at the both ends of the cable. Accordingly, it is possible to improve the cable in transmission capability and noise resistance.

Figure 14:
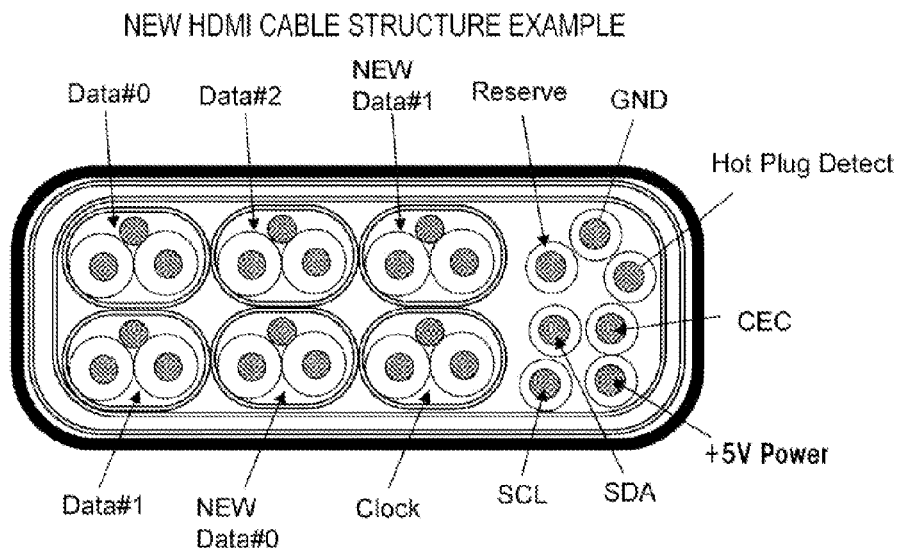
FIG. 14 is a diagram of another example of a structure of a new HDMI cable.

FIG. 14 illustrates an example of another structure of the new HDMI cable used as cable 200. The new HDMI cable is the same as the new HDMI cable illustrated in FIG. 13 in essential structure except that the cross section has a flat shape. It is known to, by setting the flat cross section, reduce a cross-section area and easily achieve impedance matching.

[Determination on Availability of Video Data Transmission Using the New HDMI Function]

Next, determination on availability of video data transmission using the new HDMI function at the control unit 114 of the source device 110 will be described. When the cable is a new HDMI cable and the sink device is a new HDMI device, the control unit 114 determines that video data transmission using the new HDMI function is enabled. In the AV system 10 illustrated in FIG. 1, as described above, the cable 200 is a new HDMI cable and the sink device 120 is a new HDMI device.

Figure 15:
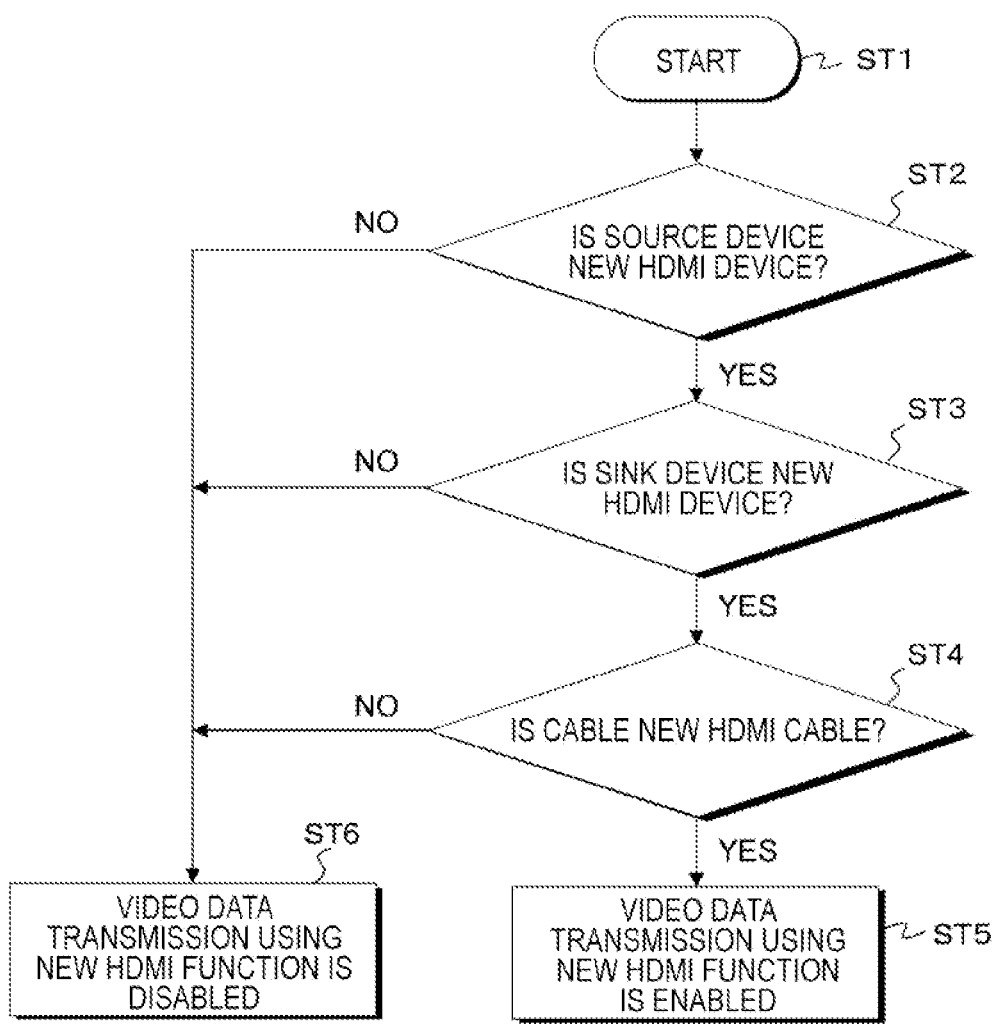
FIG. 15 is a flowchart of an example of a process of determining availability of video data transmission using a new HDMI function at a control unit.

The flowchart in FIG. 15 shows an example of a process of determining availability of video data transmission using the new HDMI function at the control unit 114. The control unit 114 starts the process at step ST1 and then moves to step ST2. At step ST2, the control unit 114 determines whether the source device 110 is a new HDMI device including a data transmitting/receiving unit for video data transmission using the new HDMI function. The control unit 114 has in advance capability information of the source device 110 in which the control unit 114 exists, and thus can easily make the determination. Since the source device 110 obviously supports the new HDMI, the control unit 114 may omit the determination at step ST2.

If determining that the source device 110 supports the new HDMI, the control unit 114 then determines at step ST3 whether the sink device connected via a cable is a new HDMI device including a data transmitting/receiving unit for video data transmission using the new HDMI function. Details of the determination will be given later. If determining that the sink device is a new HDMI device, the control unit 114 moves to step ST4. At step ST4, the control unit 114 determines whether the cable corresponds to a new HDM cable (refer to FIG. 13). Details of the determination will be given later.

If determining that the cable is a new HDMI cable, the control unit 114 moves to step ST5. At step ST5, the control unit 114 determines that video data transmission using the new HDMI function is enabled. In this case, the source device 110 can perform not only video data transmission using the conventional HDMI function but also video data transmission using the new HDMI function, with the sink device connected via the cable.

If determining at step ST2 that the source device 110 is not a new HDMI device, the control unit 114 moves to step ST6.

In addition, if determining at step ST3 that the sink device is not a new HDMI device, the control unit 114 moves to step ST6. Further, if determining at step ST4 that the cable is not a new HDMI cable, the control unit 114 moves to step ST6. At step ST6, the control unit 114 determines that video data transmission using the new HDMI function is disabled. In this case, the source device 110 can perform only video data transmission using the conventional HDMI function, with the sink device connected via the cable.

If determining at step ST3 that the sink device 120 is a new HDMI device, for example, the control unit 114 transmits the final determination result to the sink device via the cable. The determination result is transmitted using, for example, the CEC line in the conventional HDMI transmission system or the data line pair corresponding to the new TMDS channel, or the like. The sink device can determine availability of video data transmission using the new HDMI function with the source device 110, based on the determination result transmitted from the source device 110.

In addition, if determining at step ST5 that video data transmission using the new HDMI function is enabled, the control unit 114 may control an UI screen indicative of the determination result to be given on a display unit (display) as illustrated in FIG. 16(a), for example. By viewing the UI screen, the user can easily understand that video data transmission using the new HDMI function is enabled. The display unit (display) on which the UI screen is displayed refers to a not illustrated display unit (display) provided at the source device 110 or a not illustrated display unit (display) provided at the sink device 120. This also applies to the following UI displays.

When determining at step ST4 that the cable is not a new HDMI cable and moving to step ST6, the control unit 114 may control the display unit (display) to show an UI screen indicative of the effect as illustrated in FIG. 16(b), for example. By viewing the UI screen, the user can easily recognize that the source device 110 and the sink device are new HDMI devices but the cable is not a new HDMI cable, and then can easily take measures such as replacing the cable with a new HDMI cable.

[Process at Starting and Ending of Transmission by the New HDMI Transmission System]

Figure 17:
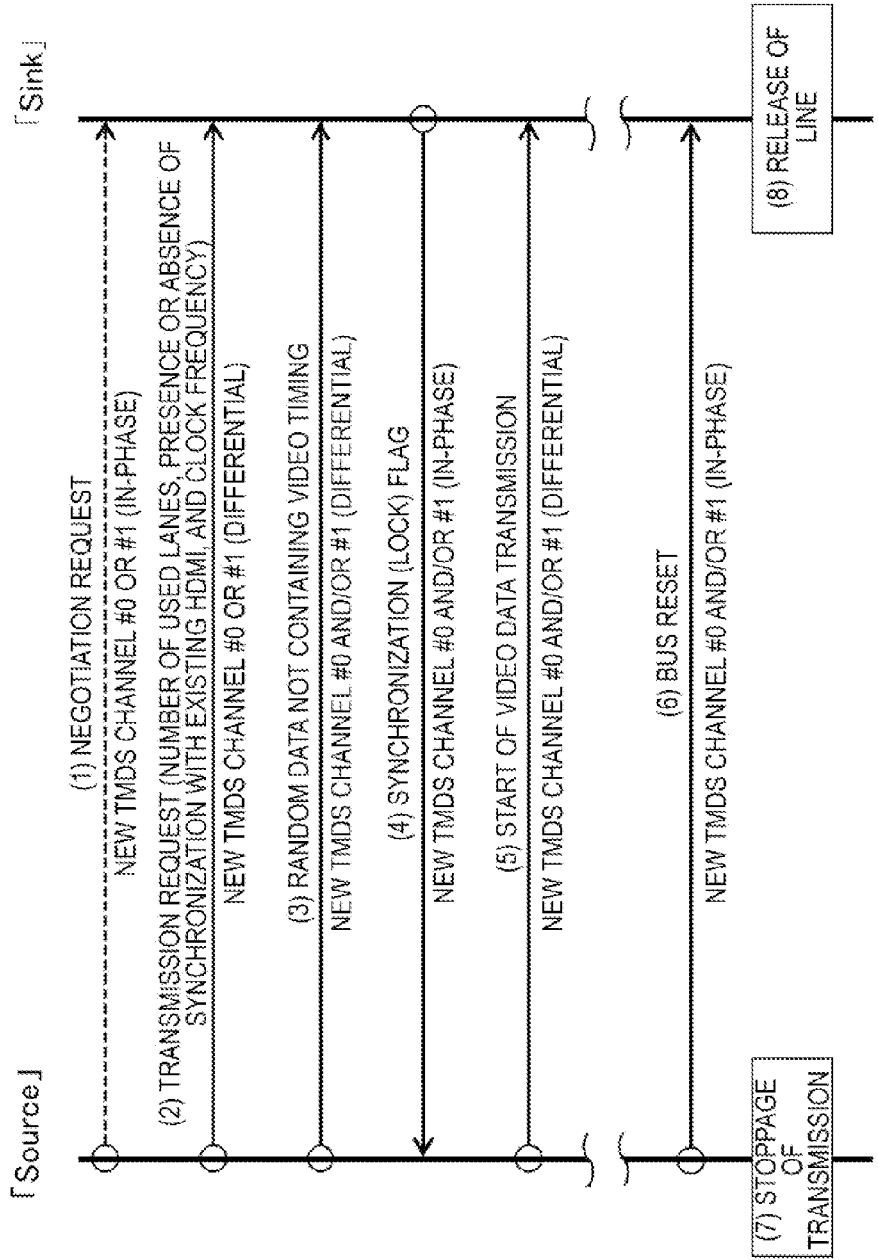
FIG. 17 is a sequence diagram of an example of processes at start and end of transmission in the new HDMI transmission system.

Next, the process at starting and ending of transmission by the new HDMI transmission system in the AV system 10 illustrated in FIG. 1 will be described. The sequence diagram in FIG. 17 shows an example of the process.

If none of the two new HDMI differential data lines (data line pairs corresponding to the new TMDS channels) are used, the new TMDS channel #0 is configured in advance to enable data transmission from the source device to the sink device in the conventional HDMI connection, and the new TMDS channel #1 is configured in advance to enable data transmission from the sink device to the source device in the conventional HDMI connection.

If one of the channels #0 and #1 is used and the other is not used, both of the devices keep the unused new TMDS channel in the released state.

The transmitter and the receiver for in-phase signals are always in the operational state. After confirming that the bus is not used, that is, is in the high-impedance state, the transmitter is driven to transmit a command.

If there is only one unused new TMDS channel, one device to transmit video data sends a negotiation request command (refer to FIG. 7(d)) as an in-phase signal for the unused new TMDS channel, to the other device (refer to (1) in FIG. 7(d)). In this example, the one device will be designated as "Source" in the diagrams and the following description, and thus may not refer to the source device in the existing HDMI connection. The other device will be designated as "Sink" in the diagrams and the following description, and thus may not refer to the sink device in the existing HDMI connection.

The "Source" having transmitted the negotiation request sets the differential signal transmitter/receiver for the unused new TMDS channel to the transmission side.

The "Sink" having received the negotiation request sets the differential signal transmitter/receiver for the unused new TMDS channel to the reception side and waits. If none of the two new TMDS channels are used, the operation (1) illustrated in the drawing is not necessary but both of the two devices use a differential signal in the new TMDS channel corresponding to their respective transmission directions to perform the following steps.

The "Source" uses a differential signal in the new TMDS channel to send a transmission request (command) to the "Sink" (refer to (2) in the diagram). The transmission does not need to be performed at a high speed, and thus can be performed using a significantly low-speed signal not requiring clock synchronization at the receiving side.

If none of the two new TMDS channels are used, the transmission request contains information on the number of new TMDS channels to be used (one or two). If the direction of the transmission is the same as the transmission direction in the existing HDMI, the transfer request contains information on the presence or absence of synchronization with the existing HDMI transmission. Further, the transmission request contains information on transmission frequency (clock frequency) at video data transmission. The information on transmission frequency is not configured so as not to exceed the reception capacity of the "Sink", taking into account the information on reception capacity (EDID) of the "Sink" separately acquired in advance.

Upon completion of transmission of the transfer request (command), the "Source" transmits training data (random data) for the transmission frequency notified earlier for stable clock generation at the "Sink" side, as an actual differential signal of the new TMDS channel, to the new TMDS channel(s) (#0 or #1 or both) actually performing video data transmission (refer to (3) in the drawing). The training data is a random pattern signal suited for clock extraction training, which does not contain various timing signals (vertical synchronization signal and horizontal synchronization signal) in video signals.

The "Sink" side operates its clock extraction circuit according to the previously acquired information on the transmission frequency to attempt extraction of a clock using the training data transmitted from the "Source". When the "Sink" side becomes capable of extracting stably the clock information from the received data, the "Sink" side uses the received in-phase signal of the new TMDS channel to transmit a synchronization flag command (refer to FIG. 7(c)) to report completion of preparation for video data reception to the "Source" side (refer to (4) in the drawing). In the case of using both of the two new TMDS channels, the transmission of the synchronization flag command is performed over each of the channels.

Upon receipt of the synchronization flag command from all of the new TMDS channel(s) performing transmission (#0 or #1 or both), the "Source" starts transmission of video data as a differential signal of the new TMDS channel(s) (refer to (5) in the drawing). By the foregoing steps, the transmission of video data using the new HDMI differential data line is started.

When the "Source" device changes the resolution of video contents or the "Sink" is powered off and reception of the video contents is unnecessary, the new TMDS channel is reset and released from the "Source" and "Sink", and enters in the unused state. The resetting of the new TMDS channel may be performed independently for each channel.

The device with the new TMDS channel to be reset (the "Source" in the drawing but the "Sink" may request for resetting) transmits a reset flag command (refer to FIG. 7(b)) as an in-phase signal of the new TMDS channel(s) (#0 or #1 or both) under transmission of video data by a differential signal, to the other device (refer to (6) in the drawing).

The device having received the reset flag command turns the receiver or the transmitter of its new TMDS channel during transmission to the inactive state to release the new TMDS channel under transmission of video data and turn the channel into the unused state (refer to (7) and (8) in the drawing). To restart video data transmission, the foregoing steps starting from (1) in the drawing are performed again.

EXAMPLES OF VIDEO DATA TRANSMISSION

Next, examples of video data transmission in the AV system 10 illustrated in FIG. 1 will be described.

Transmission Example 1

4K2K, 60-Hz, Progressive Video Data Transmission

In the transmission example 1, the conventional HDMI transmission system (the data transmitting unit 112 and the data receiving unit 122) and the new HDMI transmission system (the data transmitting/receiving unit 113 and the data transmitting/receiving unit 123) perform equivalent transmission in synchronization to transmit 4K2K, 60-Hz, progressive video data.

Figure 18:
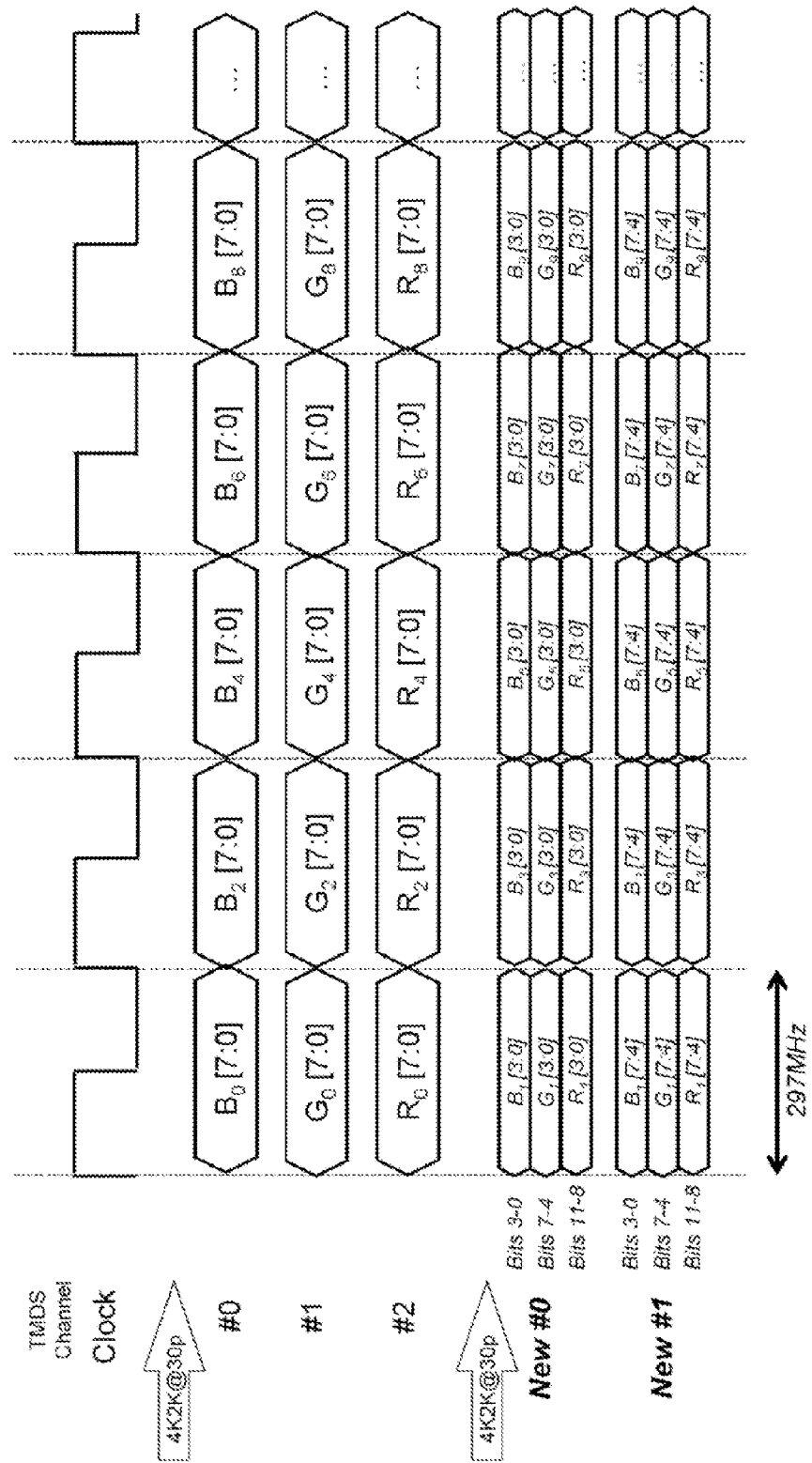
FIG. 18 is a diagram of an example of video data transmission (transmission example 1: 4K2K, 60 Hz, progressive video data transmission) in an AV system.

FIG. 18 illustrates the transmission example 1. In the drawing, the TMDS channels #0, #1, and #2 and the TMDS clock channel constitute the conventional HDMI transmission system portion, and transmit the 4K2K, 30-Hz progressive video data under the conventional HDMI standards. The transmission is performed by the data transmitting unit 112 of the source device 110 and the data receiving unit 122 of the sink device 120.

Here, 8-bit video data each is transmitted as 10-bit data over each of the channels at each pixel clock period, that is, at each TMDS clock (TMDS Clock). The transmission rate of each of the channels is 2.97 Gbps that is ten times the pixel clock rate (297 MHz). In this case, at each TMDS clock cycle, 8-bit data of blue (B) is transmitted over the channel #0, 8-bit data of green (G) is transmitted over the channel #1, and 8-bit data of red (R) is transmitted over the channel #2.

In the drawing, the new TMDS channels #0 and #1 constitute the new HDMI transmission system portion, and transmit the remaining 4K2K, 30-Hz, progressive video data. The transmission is performed by the data transmitting/receiving unit 113 of the source device 110 and the data transmitting/receiving unit 123 of the sink device 120.

Here, over each of the channels, 12-bit data is transmitted as 15-bit data in one pixel clock period, that is, at one TMDS clock (TMDS Clock) cycle. The transmission rate of each of the channels is 4.45 Gbps that is 15 times the pixel clock rate (297 MHz). That is, the new TMDS channels have a transmission capability 1.5 times that of the conventional TMDS channels. In this case, at each TMDS clock cycle, 4-bit data each of blue (B), green (G), and red (R) is transmitted over each of the channels. Accordingly, at each TMDS clock cycle, 8-bit data each of the respective colors is transmitted over the two new TMDS channels.

Figure 19:
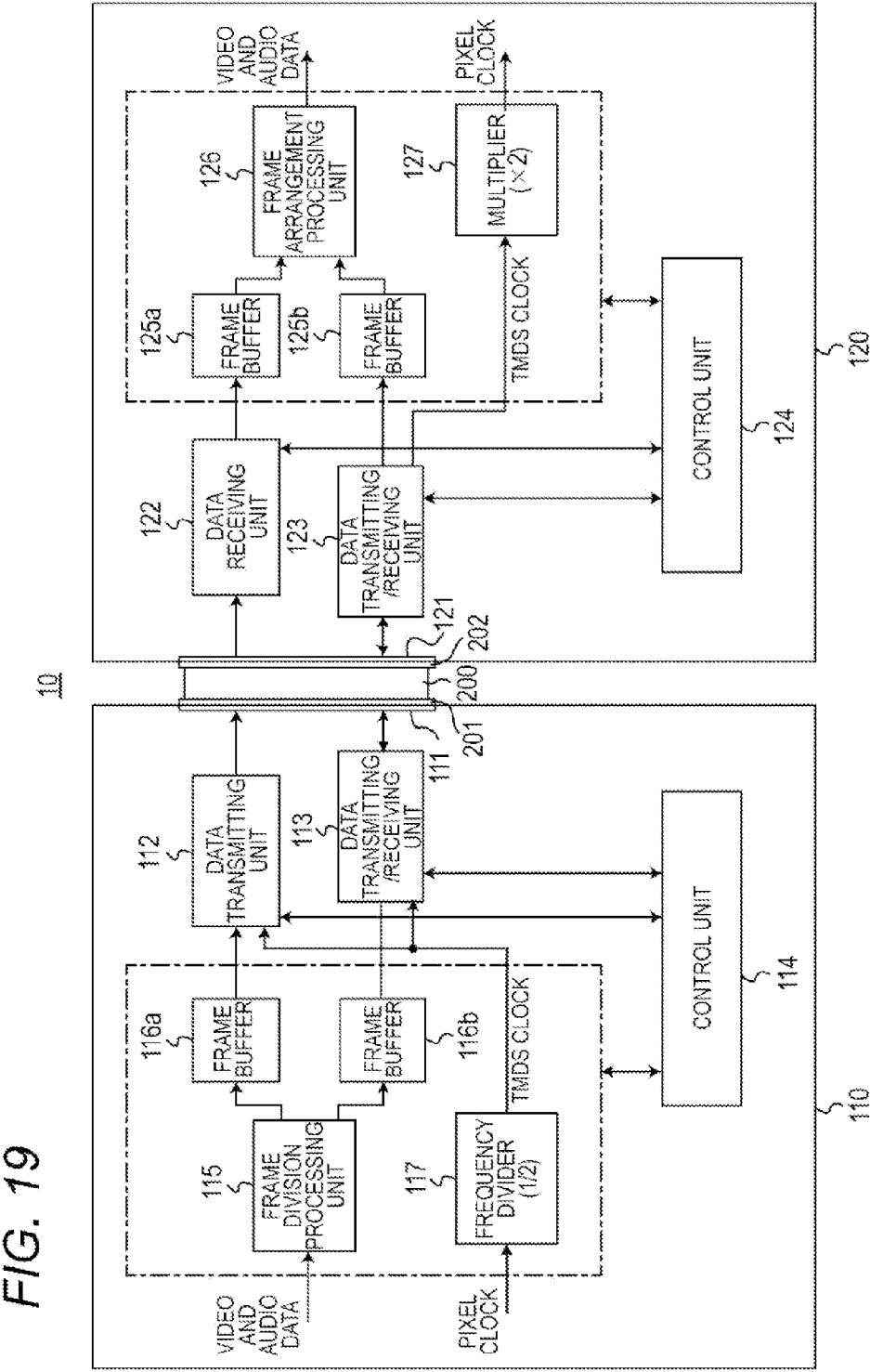
FIG. 19 is a block diagram of an example of configurations of the source device and the sink device under execution of the transmission example 1.

FIG. 19 is a block diagram of a detailed example of configurations of the source device 110 and the sink device 120 under transmission of 4K2K, 60-Hz, progressive video data as described above. In FIG. 19, the same components as those in FIG. 1 are given the same reference signs, and detailed descriptions thereof will be omitted as appropriate.

The source device 110 has the data transmitting unit 112 and the data transmitting/receiving unit 113 described above, a frame division processing unit 115, frame buffers 116a and 116b, and a frequency divider 117. The frame division processing unit 115 divides video data and audio data into frames, that is, divides the data in frame. The frame division processing unit 115 obtains first video data composed of odd frames and first audio data corresponding to the first video data, and second video data composed of even frames and second audio data corresponding to the second video data.

Here, video data to be transmitted is 4K2K, 60-Hz progressive video data. Each of the first video data and the second video data obtained by dividing the video data into frames constitutes 4K2K, 30-Hz progressive video data.

The frame buffer 116a temporarily accumulates the first video data and the first audio data obtained by the frame division processing unit 115. The frame buffer 116b temporarily accumulates the second video data and the second audio data obtained by the frame division processing unit 115. The frequency divider 117 subjects a pixel clock corresponding to the video data not yet to be divided to ½ frequency division to generate a TMDS clock, and supplies the TMDS clock to the data transmitting unit 112 and the data transmitting/receiving unit 113.

The data transmitting unit 112 constitutes a conventional HDMI transmission system as described above. The data transmitting unit 112 transmits video data and audio data to the data receiving unit 122 of the sink device 120 over the data line pairs of TMDS channels #0, #1, and #2 of the cable 200. The data transmitting/receiving unit 113 constitutes a new HDMI transmission system as described above. The data transmitting/receiving unit 113 transmits video data and audio data to the data transmitting/receiving unit 123 of the sink device 120 over the data line pairs of new TMDS channels #0 and #1 of the cable 200.

The data transmitting unit 112 and the data transmitting/receiving unit 113 transmit the first and second video data as divided data in each frame together with first information indicative of the presence of another divided video data to be coupled and second information for synchronization with the other divided video data, respectively. The second information includes time code information and arrangement information indicative of the arrangement sequence of two frames having a time code indicated by the time code information.

The data transmitting unit 112 and the data transmitting/receiving unit 113 transmit the first and second information in each frame inserted into blanking periods of the first and second video data as divided video data, respectively. For example, the data transmitting unit 112 and the data transmitting/receiving unit 113 transmit the first and second information to the sink device 120 with the use of HDMI Vendor Specific InfoFrame.

FIG. 20 illustrates an example of a structure of HDMI Vendor Specific InfoFrame packet (hereinafter, referred to as "VSIF packet"). The packet structure is defined under CEA861 standards and descriptions thereof will be omitted. The VSIF packet is composed of a packet header and a packet body. FIG. 20 illustrates only the structure of the packet body for ease of explanation.

Arranged in the seventh bit of the fifth byte (PB) is "DualLink" constituting the first information. When the one-bit information is "1", there exists another divided video data to be coupled. That is, by setting the one-bit information at "1", it is possible to allow the reception side to recognize the presence of another divided video data to be coupled to the divided video data and request the reception side for generation of reception video data by a coupling (frame arrangement) process.

The time code information is arranged in the sixth byte (PB) to the ninth byte (PB). The sixth byte, the seventh byte, the eighth byte, and the ninth byte here indicate "frame", "second", "minute", and "hour" of a time code, respectively. The arrangement information "Even/Odd" is arranged in the seventh bit of the tenth byte (PB). When the one-bit information is "0", the frame is an even-numbered frame (Even). Meanwhile, when the one-bit information is "1", the frame is an odd-numbered frame (Odd).

For each of the divided video data transmitted over the cable 200, the sink device 120 can recognize from the "DualLink" information of the VSIF packet added to the divided video data that generation of a reception video signal by the coupling process is requested. The sink device 120 can also recognize in sequence two frames having the same time code, from the time code information in the sixth byte to the ninth byte of the VSIF packet for each of the divided video data. In addition, the sink device 120 can arrange the data in the arrangement sequence indicated by the one-bit information of "Even/Odd" to generate the synthesized reception video data.

Returning to FIG. 19, the sink device 120 has the data receiving unit 122 and the data transmitting/receiving unit 123 described above, and a control unit 124, frame buffers 125a and 125b, a frame arrangement processing unit 126, and a multiplier 127.

The data receiving unit 122 constitutes a conventional HDMI transmission system as described above. The data receiving unit 122 receives the first video data transmitted from the data transmitting unit 112 of the source device 110 over the data line pairs of the TMDS channels #0, #1, and #2 of the cable 200. The data transmitting/receiving unit 123 constitutes a new HDMI transmission system as described above. The data transmitting/receiving unit 123 receives the second video data transmitted from the data transmitting/receiving unit 113 of the source device 110 over the data line pairs of the new TMDS channels #0 and #1 of the cable 200.

As described above, the first and second video data as divided video data have in each frame the additional first information indicative of the presence of another divided video data to be coupled and the additional second information for synchronization with the other divided video data to be coupled.

The frame buffer 125a temporarily accumulates the first video data and the first audio data received by the data receiving unit 122. The frame buffer 125b temporarily accumulates the second video data and the second audio data received by the data transmitting/receiving unit 123. The frame arrangement processing unit 126 arranges and synthesizes in frames the first video data and the first audio data held at the frame buffer 125a and the second video data and the second audio data held at the frame buffer 125b. Accordingly, the frame arrangement processing unit 126 generates the reception video data and the reception audio data.

Here, the control unit 124 recognizes that each of the video data is to be coupled and generation of the reception video data by the coupling process is requested, from the first information added to the first and second video data (the one-bit information in "DualLink" of the VSIF packet). Then, the control unit 124 allows the frame arrangement processing unit 126 to start the arrangement process.

The frame arrangement processing unit 126 performs the frame arrangement process based on the second information (time code information and arrangement information) added to the first and second video data to generate reception video data and reception audio data. Specifically, the frame arrangement processing unit 126 recognizes in sequence two frames having the same time code, from the time code information of the VSIF packet, and arranges the frames in the arrangement sequence indicated by the one-bit information of "Even/Odd" to obtain the synthesized reception video data and reception audio data.

The multiplier 127 multiplies by two the TMDS clock obtained by the data receiving unit 122 or the data transmitting/receiving unit 123, in the embodiment, by the data transmitting/receiving unit 123, to generate a pixel clock. The pixel clock is used by the sink device 120 to process the reception video data and the reception audio data.

Transmission Example 2

Full-HD, 60-Hz, 16-bit Deep Color Video Data Transmission

In the transmission example 2, the conventional HDMI transmission system (the data transmitting unit 112 and the data receiving unit 122) and the new HDMI transmission system (the data transmitting/receiving unit 113 and the data transmitting/receiving unit 123) are used in cooperation as in the foregoing transmission example 1. In the transmission example 2, 1920×1080-pixel, 60-Hz progressive video data (color information of RGB is of 16 bits each) is transmitted.

FIG. 21 illustrates the transmission example 2. As illustrated in the drawing, higher 8 bits of 16 bits each of respective colors are transmitted over the conventional HDMI transmission path. The higher 8 bits constitute video data to be transmitted in a 24-bit non-deep color (Deep Color) mode. Lower 8 bits of 16 bits each of respective colors are transmitted in the new HDMI transmission path. The color information transmitted in the new HDMI transmission path is used in synchronization with the color information transmitted over the conventional HDMI transmission path, which makes it possible to provide display in the deep color mode of 16 bits each of respective colors.

At that time, the foregoing frame division processing unit 115 of the source device (transmitter) 110 illustrated in FIG. 19 serves as a color information division processing unit to store the higher 8 bits each of the color information in the frame buffer 116a and transmit the information to the data transmitting unit 112. Similarly, the frame division processing unit 115 stores the lower 8 bits each of the color information in the frame buffer 116b and transmits the information to the data transmitting/receiving unit 113. The frequency divider 117 is not used but the pixel clock is transmitted as a TMDS clock.

In the sink device (receiver) 120 illustrated in FIG. 19, the higher 8 bits each of the color information received at the data receiving unit 122 are stores in the frame buffer 125a. Similarly, the lower 8 bits each of the color information received at the data transmitting/receiving unit 123 are stored in the frame buffer 125b. In this case, the frame arrangement processing unit 126 serves as a color information integration unit to integrate the color information received at the frame buffer 125a and the frame buffer 125b to form 16-bit data. In this case, the multiplier 127 is not used but the received TMDS clock is passed over as a pixel clock to the subsequent stage.

As described above, in the transmission example 2, it is possible to transmit video data including high-quality color information over the conventional HDMI transmission path and the new HDMI transmission path in synchronization with each other.

Transmission Example 3

Full-HD, 60-Hz, Frame Packing-type 3D Video Data Transmission

In the transmission example 3, the conventional HDMI transmission system (the data transmitting unit 112 and the data receiving unit 122) and the new HDMI transmission system (the data transmitting/receiving unit 113 and the data transmitting/receiving unit 123) are used in cooperation as in the foregoing transmission example 1. In the transmission example 3, 1920×1080-pixel, 60-Hz, frame packing-type 3D video data is transmitted.

Figure 22:
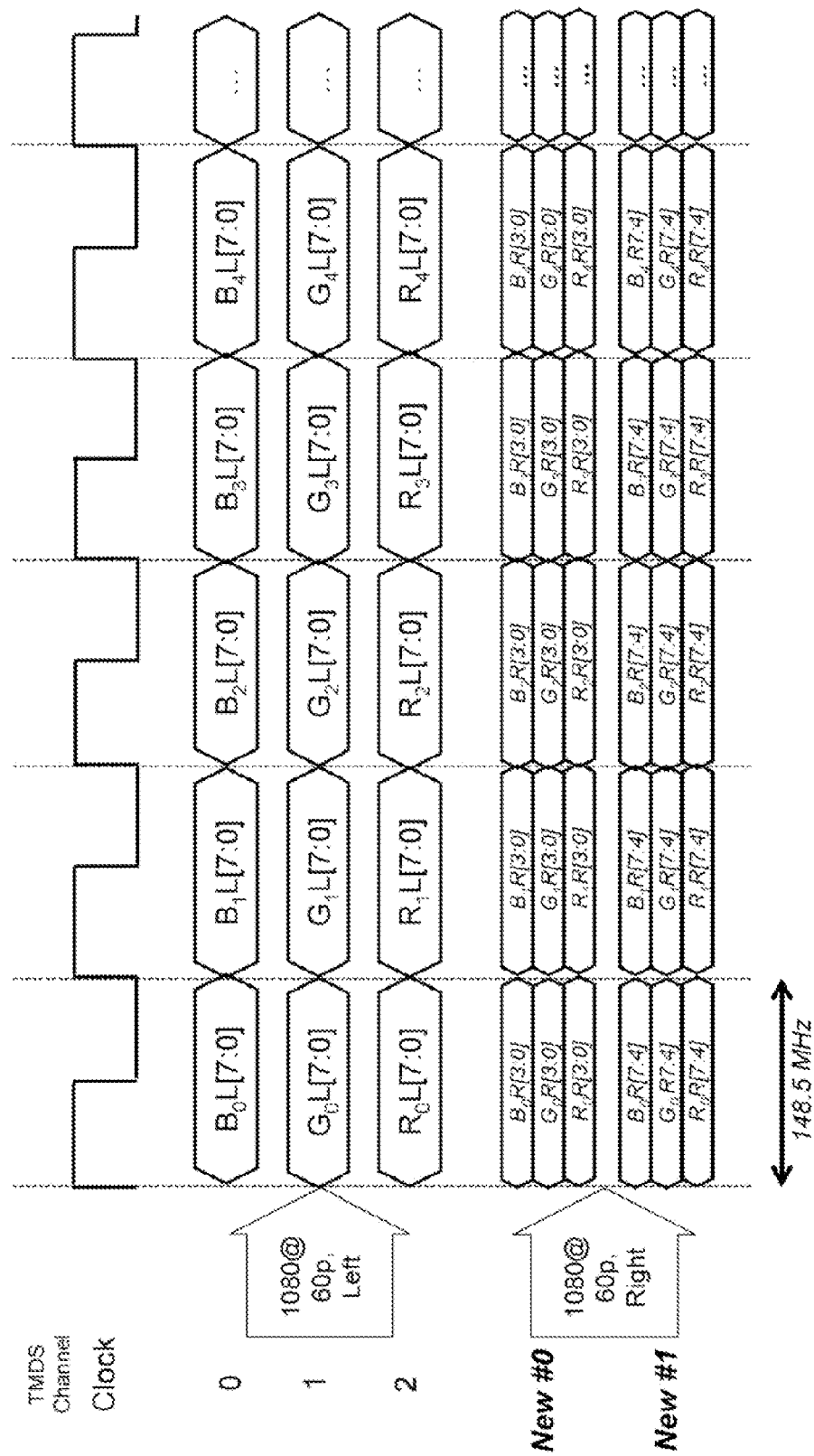
FIG. 22 is a diagram of an example of video data transmission (transmission example 3: full-HD, 60-Hz, frame packing-type 3D video data transmission) in the AV system.

FIG. 22 illustrates the transmission example 3. In the drawing, BiL[7:0], GiL[7:0], and RiL[7:0] denote signals (data) of blue, green, and red as left eye signals, respectively, and BiR[7:0], GiR[7:0], and RiR[7:0] denote signals (data) of blue, green, and red as right eye signals, respectively.

As illustrated in the drawing, the left-eye video signals (left-eye video data) are transmitted over the conventional HDMI transmission path, and right-eye video signals (right-eye video data) are transmitted over the new HDMI transmission path. Frame packing-type 3D video signals can be transmitted over the conventional HDMI transmission path and the new HDMNI transmission path in synchronization with each other.

At that time, the foregoing frame division processing unit 115 of the source device (transmitter) 110 illustrated in FIG. 19 serves as a left-eye and right-eye video frame generation unit if the original video signal is a general 2D video signal and the 3D video signal is generated in the source device (transmitter) 110. This block may be excluded if the original video signal is already a 3D video signal. The left-eye video signal is stored in the frame buffer 116a and transmitted to the data transmitting unit 112. Similarly, the right-eye video signal is stored in the frame buffer 116b and transmitted to the data transmitting/receiving unit 113. The pixel clock is transmitted directly as a TMDS clock not through the frequency divider 117.

In the sink device (receiver) 120 illustrated in FIG. 19, the signal received at the data receiving unit 122 is stored as left-eye video data in the frame buffer 125a, and the signal received at the data transmitting/receiving unit 123 is stored as right-eye video data in the frame buffer 125b. The stored 3D video signals (left-eye video data and right-eye video data) are sent to the subsequent stage so as to be displayed as a left-eye video frame and a right-eye video frame at the frame arrangement processing unit 126. The received TMDS clock is sent directly to the subsequent stage as a pixel clock not through the multiplier 127.

As described above, in the transmission example 3, it is possible to transmit higher-level 3D video data over the conventional HDMI transmission path and the new HDMI transmission path in synchronization with each other.

Transmission Example 4

Oppositely-directed Simultaneous Transmission by the Conventional HDMI Transmission System And the New HDMI Transmission System In the transmission example 4, by the conventional HDMI transmission system (the data transmitting unit 112 and the data receiving unit 122), 1080, 60-Hz, progressive video data is transmitted from the source device 110 to the sink device 120. In the transmission example 2, by the new HDMI transmission system (the data transmitting/receiving unit 113 and the data transmitting/receiving unit 123), 1080, 60-Hz, progressive video data is transmitted from the sink device 120 to the source device 110.

Figure 23:
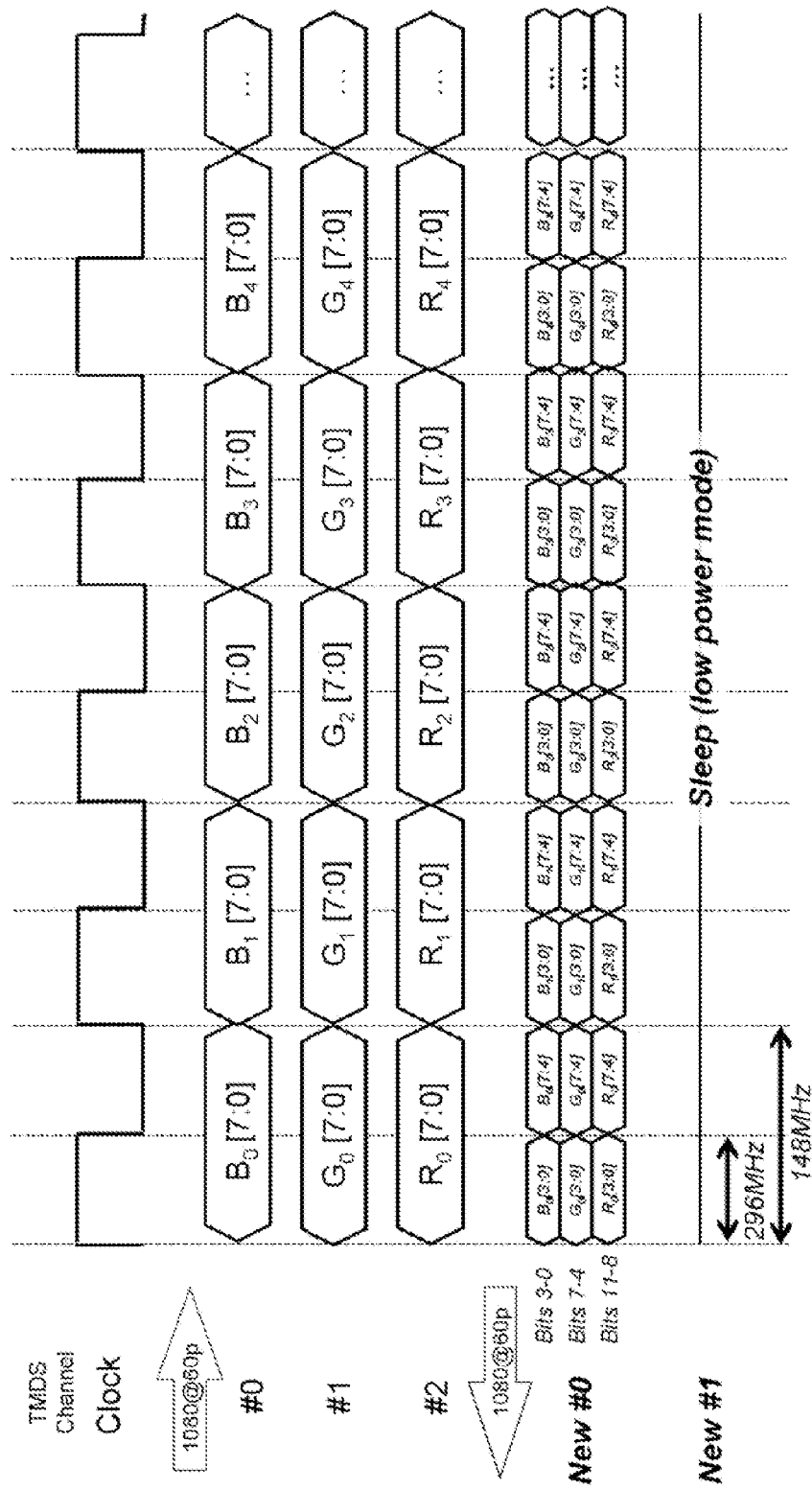
FIG. 23 is a diagram of an example of video data transmission (transmission example 4: reverse simultaneous transmission by the conventional HDMI transmission system and the new HDMI transmission system) in the AV system.

FIG. 23 illustrates the transmission example 4. In the drawing, the TMDS channels #0, #1, and #2 and the TMDS clock cannel constitute conventional HDMI transmission system portions, which transmits 1080, 60-Hz, progressive video data from the source device 110 to the sink device 120 under the conventional HDMI standards. The transmission is performed by the data transmitting unit 112 of the source device 110 and the data receiving unit 122 of the sink device 120.

Here, 8-bit video data each is transmitted as 10-bit data over each of the channels at each pixel clock period, that is, at each TMDS clock (TMDS Clock). The transmission rate of each of the channels is 1.48 Gbps that is 10 times the pixel clock rate (148 MHz). In this case, at each TMDS clock cycle, 8-bit data of blue (B) is transmitted over the channel #0, 8-bit data of green (G) is transmitted over the channel #1, and 8-bit data of red (R) is transmitted over the channel #2.

In the drawing, the new TMDS channel #0 constitutes a new HDMI transmission system portion, which transmits 1080, 60-Hz, progressive video data from the sink device 120 to the source device 110. The transmission is performed by the data transmitting/receiving unit 113 of the source device 110 and the data transmitting/receiving unit 123 of the sink device 120.

Here, 12-bit data is transmitted as 15-bit data in one pixel clock period, that is, in the first half of one TMDS clock (TMDS Clock) cycle, and 12-bit data is transmitted as 15-bit data in the second half of the TMDS clock cycle. The transmission rate of the new TMDS channel #0 is 4.44 Gbps that is 30 times the pixel clock rate (148 MHz).

That is, the new TMDS channel #0 has a transmission capability that is three times that of the conventional TMDS channel. In this case, in each of the first and second halves of the TMDS clock cycle, 4 bits each of data of blue (B), green (G), and red (R) is transmitted over the new TMDS channel #0. Accordingly, at each TMDS clock cycle, 8-bit data each of the respective colors is transmitted over the new TMDS channel #0.

In the drawing, the new TMDS channel #1 constitutes a new HDMI transmission system portion which is placed in the sleep mode (low-power mode). The new TMDS channel #0 and the new TMDS channel #1 may be reversed in state. Specifically, 1080, 60-Hz, progressive video data may be transmitted from the sink device 120 to the source device 110 over the new TMDS channel #1. Although, in the drawing, the conventional HDMI transmission system and the new HDMI transmission system are in synchronization with each other for the sake of convenience, the two are completely independent from each other and may not necessarily be in synchronization with each other.

Transmission Example 5

Video data transmission only by the new HDMI transmission system

In the transmission example 5, by the new HDMI transmission system (the data transmitting/receiving unit 113 and the data transmitting/receiving unit 123), 1080, 60-Hz, progressive video data is transmitted from the source device 110 to the sink device 120.

Figure 24:
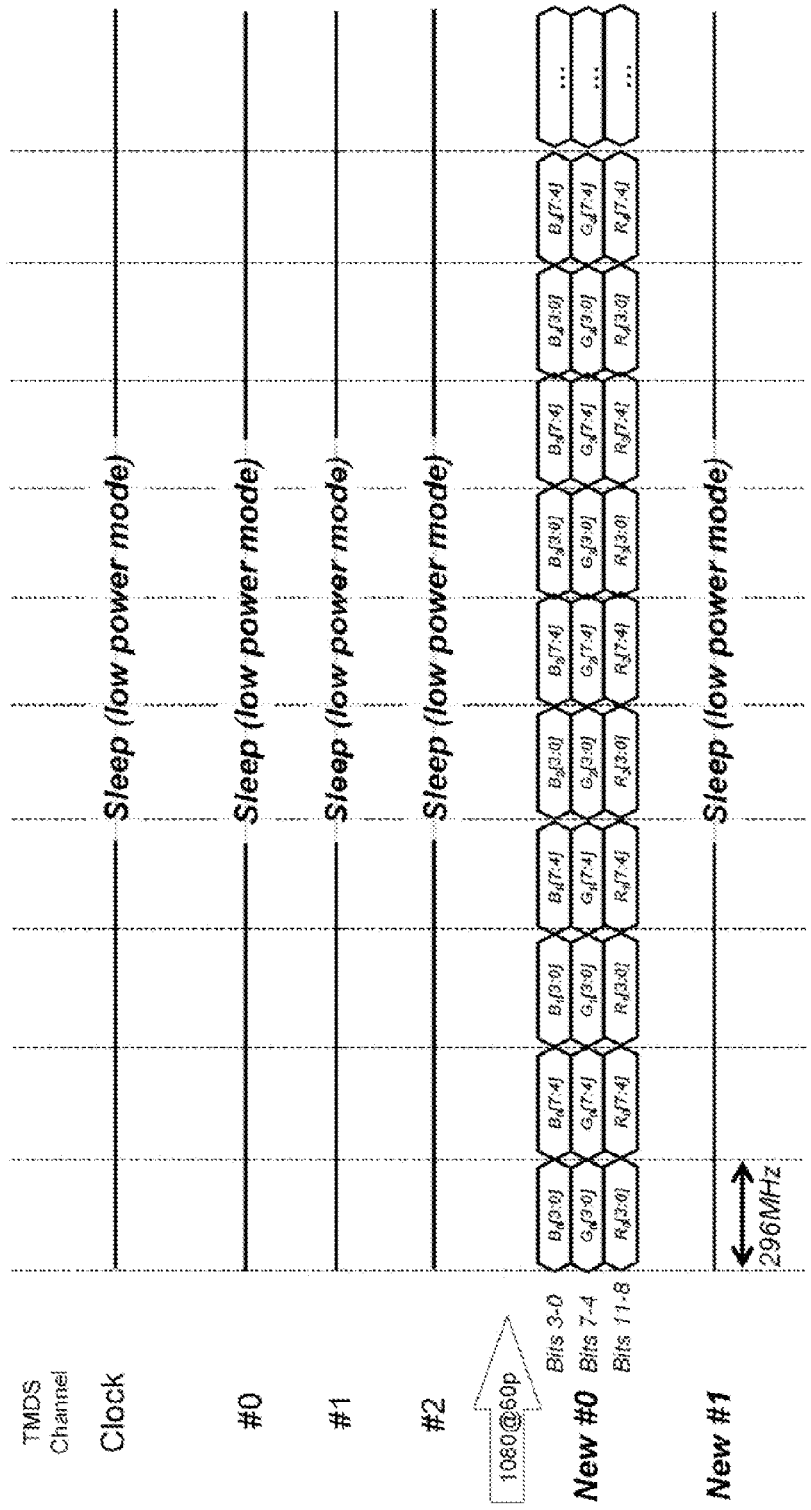
FIG. 24 is a diagram of an example of video data transmission (transmission example 5: video data transmission only by the new HDMI transmission system) in the AV system.

FIG. 24 illustrates the transmission example 5. In the drawing, the new TMDS channel #0 constitutes a new HDMI transmission system, which transmits 1080, 60-Hz, progressive video data from the source device 110 to the sink device 120. The transmission is performed by the data transmitting/receiving unit 113 of the source device 110 and the data transmitting/receiving unit 123 of the sink device 120. The transmission rate is the same as that in the transmission example 4 illustrated in FIG. 23.

In the drawing, the new TMDS channel #1 constitutes a new HDMI transmission system portion which is placed in the sleep mode (low-power mode). The new TMDS channel #0 and the new TMDS channel #1 may be reversed in state. In the drawing, the TMDS channels #0, #1, and #2 and the TMDS clock channel constitute conventional HDMI transmission system portions, which are placed in a sleep mode (low power mode). It is necessary to operate four DC-coupled differential channels as conventional HDMI channels, which causes large power consumption. By using the new HDMI channel, it is possible to transmit data only over one AC-coupled differential channel, which allows transmission with a power consumption that is about ¼ of that in the conventional HDMI.

[Determination on Support of the New HDMI by the Sink Device]

Methods for determining at the control unit 114 whether the sink device 120 is a new HDMI device will be described. The determination methods include a first determination method and a second determination method as described below, for example.

[First Determination Method]

The control unit 114 determines whether the sink device is a new HDMI device based on the EDID read from the sink device using the DDC lines (SDA line and SCL line) of the cable. The EDID has a data structure defined in a format. It is assumed that flag information indicative of whether the sink device supports the new HDMI (new transmission) is newly defined at a specific place of the EDID.

FIG. 25 illustrates an example of flag information newly defined in the EDID. Originally, the EDID is a data structure indicative of the capabilities of various sink devices 120. For ease of description, FIG. 25 illustrates only bytes of the EDID related to the present invention in a most simplified form. The second bit describes one-bit flag information "New Rx Sink" indicative of whether the sink device is a new HDMI device. The first bit newly defines one-bit flag information "New Cable" indicative of whether the cable is a new HDMI cable.

When the foregoing one-bit flag information "New Rx Sink" exists in the EDID read from the sink device, the control unit 114 determines whether the sink device is a new HDMI device. That is, when the sink device 120 is an existing HDMI device, the foregoing one-bit flag information "New Rx Sink" does not exist in the EDID read from the sink device 120.

[Second Determination Method]

The control unit 114 determines whether the sink device is a new HDMI device through communications with the sink device over the cable. For example, the control unit 114 determines whether the sink device is a new HDMI device on a command basis using the CEC line. Otherwise, for example, the control unit 114 determines whether the sink device is a new HDMI device by exchange of some signals using an unused line, for example, a reserved line or the like, until the transmission becomes enabled.

[Determination on Support of the New HDMI by the Cable]

Next, methods for determining at the control unit 114 whether the cable is a new HDMI cable will be described. The determination methods include first to fifth determination methods as described below. If the cable is a new HDMI cable, the first to third determination methods are performed using the information provision function of the cable.

[First Determination Method]

Figure 26:
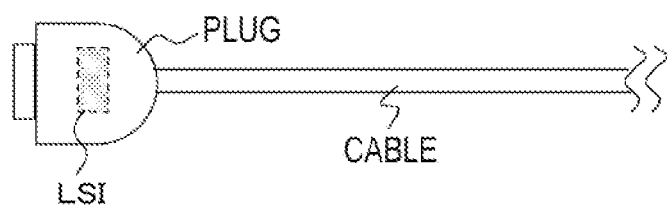
FIG. 26 is a diagram for describing a method for determining whether the cable is a new HDMI cable, and indicating that an LSI is built in a plug of the new HDMI cable.

In the case of using the first determination method, as illustrated in FIG. 26, the new HDMI cable has an LSI (large scale integration) built in a plug, for example. For example, when being supplied +5 V from the source device 110, the sink device 120 requests the LSI for an output by a CEC protocol while the HPD is dropped to Low. Responsive to the request for an output from the sink device 120, the LSI reports to the sink device 120 register values implemented in the LSI (cable characteristic data such as data indicative of supporting the new HDMI and data indicative of a transmissible data bandwidth) by the CEC protocol.

The sink device 120 writes additionally the information reported from the LSI into its EDID. The sink device 120 instructs the source device 110 to read the EDID by setting the HPD to High after the additional writing. The control unit 114 determines whether the cable supports the new HDMI based on the EDID read from the sink device 120. That is, when the EDID includes information indicating that the cable is a new HDMI cable or the like, the control unit 114 determines that the cable is a new HDMI cable.

As described above, the sink device 120 requests the LSI for an output by the CEC protocol.

Alternatively, it is considered that the source device 110 may request the LSI for an output by the CEC protocol to receive directly from the LSI a report on register values (cable characteristic data such as data indicative of supporting the new HDMI and data indicative of a transmissible data bandwidth).

[Second Determination Method]

In the case of using the second determination method, as illustrated in FIG. 26, the new HDMI cable has an LSI built in a plug, for example. The source device 110 reads and acquires from the sink device 120 the EDID indicative of the capability of the sink device 120 at the timing when the HPD turns from Low to High, for example. In this case, the EDID is notified to the source side by transmitting in serial data written in the EEPROM of the sink device 120 using an SDA/SCL line.

The LSI observes during the transmission of the EDID the line in which the EDID information is transmitted, that is, the SDA/SCL signal. Then, when the flag information (the first bit of the predetermined byte illustrated in FIG. 25) indicative of whether the cable is a new HDMI cable, the LSI changes the bit value to indicate the state in which the cable 200 supports the new HDMI, that is, the state in which the flag is set. Specifically, the data in the EDIDROM (EEPROM) of the sink device 120 indicates "00000100", and then after the LSI in the cable rewrites the data under the transmission, the data received at the source device 110 indicates "00000110".

The control unit 114 determines whether the cable is a new HDMI device based on the EDID read from the sink device 120. Specifically, when the flag information (the first bit of the predetermined byte illustrated in FIG. 25) indicative of whether the cable supports the new HDMI indicates that the cable is a new HDMI device, the control unit 114 determines that the cable is a new HDMI cable.

Figure 27:
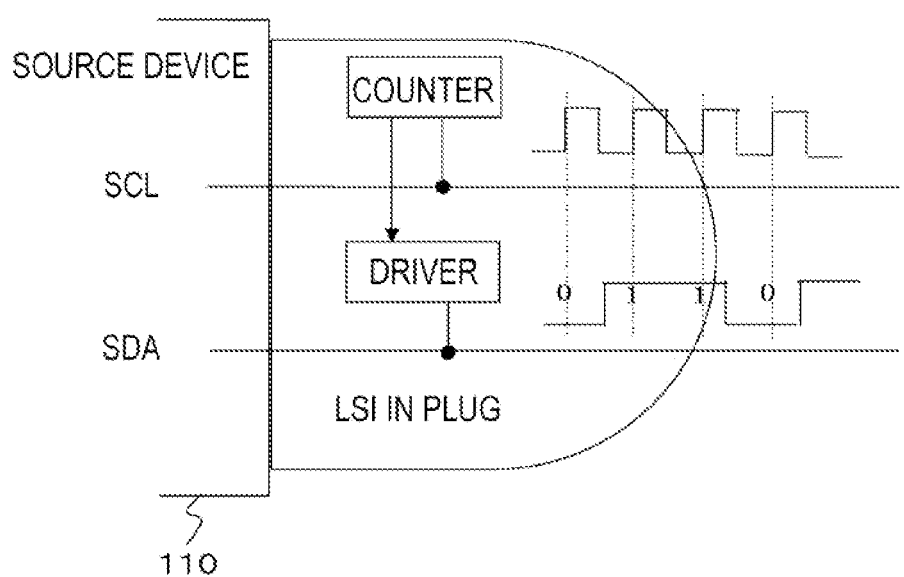
FIG. 27 is a diagram for describing a method for determining whether the cable is a new HDMI cable, and illustrating an example of an EDID data rewrite circuit of LSI in the new HDMI cable.

FIG. 27 illustrates an example of an EDID data rewriting circuit of the LSI in the cable. The LSI has a counter that counts a clock in the SCL line and a driver that rewrites data in the SDA line based on the count value of the counter.

[Third Determination Method]

Figure 28:
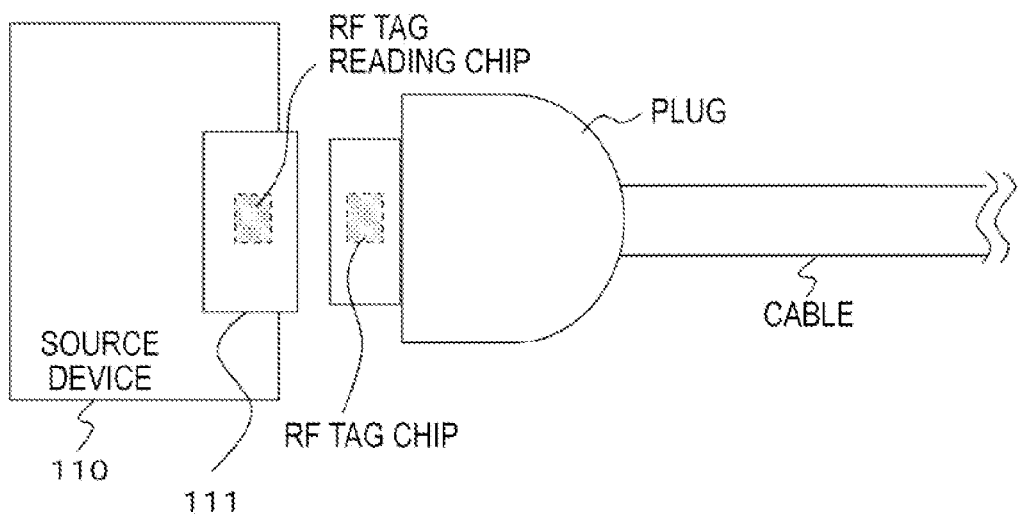
FIG. 28 is a diagram for describing a method for determining whether the cable is a new HDMI cable, and indicating that an RF tag chip (LSI) is built in a plug of the new HDMI cable.

In the case of the third determination method, as illustrated in FIG. 28, the new HDMI cable has built in the plug an RF tag chip (LSI) that stores information such as data indicative of supporting the new HDMI and data indicative of a transmissible data bandwidth, for example. The receptacle 111 of the source device 110 has an RF tag reading chip (LSI) built therein. In this case, close-range wireless communications are performed between the RF tag reading chip of the receptacle 111 and the RF tag chip of the plug such that the RF tag reading chip reads the information from the RF tag chip.

The control unit 114 determines whether the cable is a new HDMI device based on the information read by the RF tag reading chip. Specifically, when the information indicating that the cable is a new HDMI cable is read by the RF tag reading chip, the control unit 114 determines that the cable supports the new HDMI.

In the foregoing description, close-range wireless communications are performed between the RF tag reading chip of the receptacle 111 of the source device 110 and the RF tag chip of the plug such that information is read from the RF tag chip at the source device 110 side. Alternatively, it is considered that, for example, close-range wireless communications may be performed between the RF tag reading chip of the receptacle 121 of the sink device 120 and the RF tag chip of the plug such that information is read from the RF tag chip at the sink device 120 side and then the information is provided to the source device 110 side.

[Fourth Determination Method]

Figure 29:
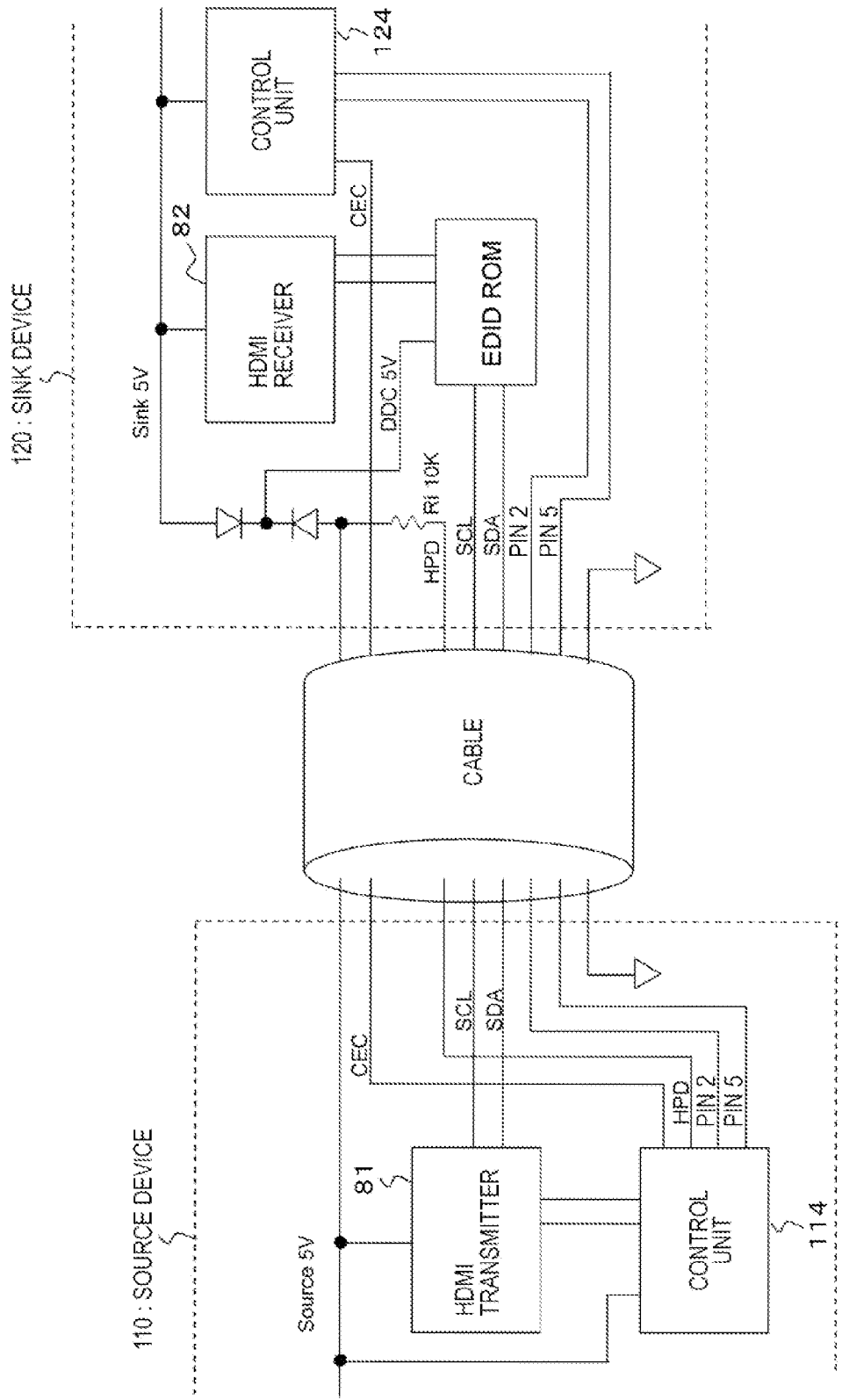
FIG. 29 is a diagram for describing a method for determining whether the cable is a new HDMI cable, and illustrating that it is determined whether the cable is a new HDMI cable by measuring electrical characteristics of the cable.

In the case of the fourth determination method, the control unit 114 determines whether the cable is a new HDMI cable by measuring the electrical characteristics of the cable. As illustrated in FIG. 29, the control unit 114 of the source device 110 issues a test signal (digital signal) for measurement and detection to the pin 2 and the pin 5, and the control unit 124 of the sink device 120 receives the signal. In the conventional HDMI cable, a pair of signal lines connected to the pin 2 and the pin 5 does not constitute a transmission path for differential signal. Meanwhile, in the new HDMI cable, a pair of signal lines connected to the pin 2 and the pin 5 constitutes a transmission path for differential signal (refer to FIGS. 10(a) and 10(b)).

The control unit 124 of the sink device 120 notifies the received digital signal to the source device 110 side over another path (for example, the DDC line of HDMI indicated as SCL/SDA, the CEC line, or the reserved line or the like). The control unit 114 of the source device 110 determines whether the cable is a new HDMI cable by checking whether there is a match between the digital signal notified from the sink device 120 and the digital signal transmitted by the control unit 114. That is, when there is a match between the reception digital signal and the transmission digital signal, the control unit 114 determines that the cable is a new HDMI cable.

Figure 30:
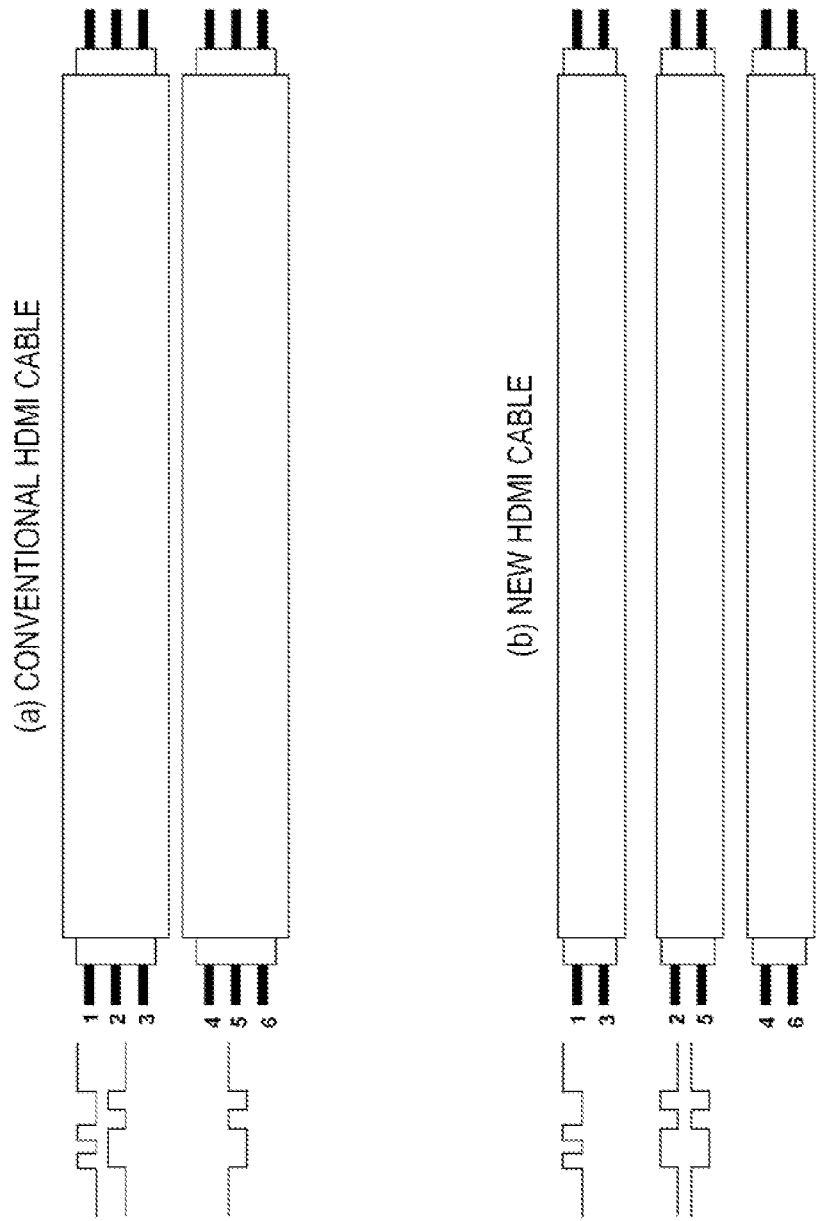
FIG. 30 is a diagram for describing that it is determined whether the cable is a new HDMI cable by measuring electric characteristics of the cable.

As illustrated in FIG. 30(a), when the cable is a conventional (existing) HDMI cable, the pair of signal lines connected to the pin 2 and the pin 5 does not constitute a shield twisted pair line. Thus, the determination that the cable 200 supports the conventional HDMI is made based on the matter that "a high-speed test signal cannot be transmitted". At that time, interference caused by applying a signal unrelated to the pin 2, to the pin 1 or the pin 3 related to the pin 2 may be used. Due to this interference, the high-speed test signal is further less prone to be transmitted.

Meanwhile, as illustrated in FIG. 30(b), when the cable is a new HDMI cable, the pair of signal lines connected to the pin 2 and the pin 5 constitutes a shield twisted pair line. Thus, the determination that the cable supports a new HDMI cable is made based on the matter that "a high-speed test signal can be transmitted". At that time, even if a signal unrelated to the pin 2 is applied to the pin 1 or the pin 3, these pins are independently shield-processed and the applied signal and the pin 2 do not interfere with each other, and thus the transmission of the test signal is not affected.

The test signal here refers to fastest data that is capable of being output from the source device 110 and random data sufficiently long enough to enable evaluation of $10^{-9}$ assured by HDMI as a bit error rate. The sink device 120 generally has a frame buffer memory built therein for video reproduction, and thus no memory dedicated for transmission test may be needed.

In the foregoing description, the control unit 114 determines that the cable supports new HDMI only when there is a match between the reception digital signal and the transmission digital signal. The control unit 114 performs the same test at a lower data transfer rate and repeats the foregoing determination process until there is a match, thereby to confirm the capability of the cable and determine that the cable is a new HDMI cable. The control unit 114 may perform only data transmission possible within the transmission speed. In this case, there is the possibility that the conventional HDMI cable is determined as a new HDMI cable.

In the foregoing description, the pin 2 and the pin 5 are used. Alternatively, instead of these pins, pin 8 and pin 11 in the same relation as that between the pin 2 and the pin 5 may be used between the conventional HDMI cable and the new HDMI cable. Specifically, a pair of signal lines connected to the pin 8 and the pin 11 in the existing HDMI cable does not constitute a transmission path for differential signal but a pair of signal lines connected to the pin 8 and the pin 11 in the new HDMI cable constitutes a transmission path for differential signal (refer to FIGS. 10(a) and 10(b)).

In the foregoing description, the source device 110 transmits a digital signal (test signal) to the sink device, and the sink device 120 notifies the received signal to the source device 110 to determine the validity of the signal at the source device 110 side. Alternatively, a predetermined pattern may be transmitted as a digital signal (test signal) such that the sink device 120 determines the validity of the received digital signal and then notifies only the determination result to the source device 110 through the CEC line or the like, or adds the information to its E-EDID.

[Fifth Determination Method]

In the case of the fifth determination method, the control unit 114 determines whether the cable is a conventional HDMI cable (hereinafter, referred to appropriately as "category A cable") or a new HDMI cable (hereinafter, referred to appropriately as "category B cable") from a difference in plug structure.

Figure 31:
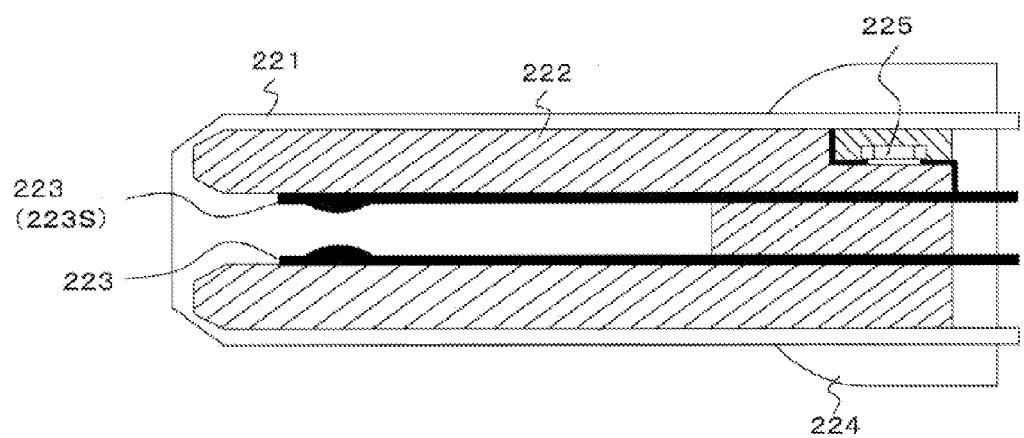
FIG. 31 is a schematic cross-section view of a structure of a plug of a category B cable (new HDMI cable).

Plug structures of the category A cable and the category B cable will be described. FIG. 31 illustrates schematically the structure of a plug 212B of the category B cable. The plug 212B has a plurality of pins 223 arranged inside of a metallic shell (shield shell) 221 via an insulator 222. The respective arrangement states of the components are fixed and held by a mold unit 224.

When the plug 212B is connected to the receptacles 111 and 121, the plurality of pins is connected to corresponding pins in the receptacles 111 and 121. The plug 212B has a resistor 225 connected between a predetermined pin 223S of the plurality of pins 223 and the metallic shell 221 for category identification. For example, the predetermined pin 223S is a predetermined pin 111S in the receptacle 111, that is, a pin corresponding to the pin with pin number 17 assigned to DDC/CEC Ground (refer to FIG. 10).

Figure 32:
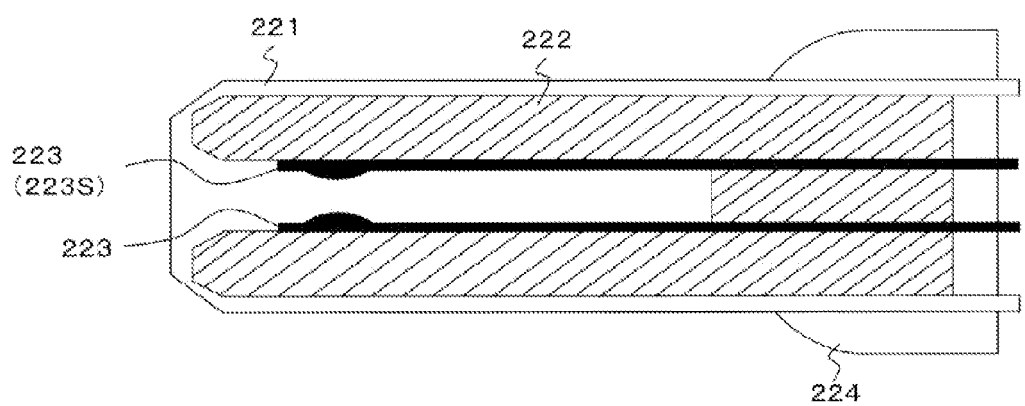
FIG. 32 is a schematic cross-section view of a structure of a plug of a category A cable (conventional HDMI cable).

FIG. 32 illustrates schematically the structure of a plug 212A of the category A cable. In FIG. 32, the same components as those in FIG. 31 are given the same reference signs and detailed descriptions thereof will be omitted as appropriate. As with the foregoing plug 212B, the plug 212A has a plurality of pins 223 in a metallic shell (shield shell) 221 via an insulator 222. The respective arrangement states of the components are fixed and held by a mold unit 224. Unlike the foregoing plug 212B, the plug 212A does not have the resistor 225 connected between a predetermined pin 223S and the metallic shell 221.

The control unit 114 applies a predetermined voltage, for example, a power voltage to a target pin (predetermined pin 111S) in the receptacle 111 to determine whether the cable is a category cable A (conventional HDMI cable) or a category B cable (new HDMI cable). In this case, the control unit 114 identifies the category of the cable based on the value of an electric current flowing through the target pin.

Figure 33:
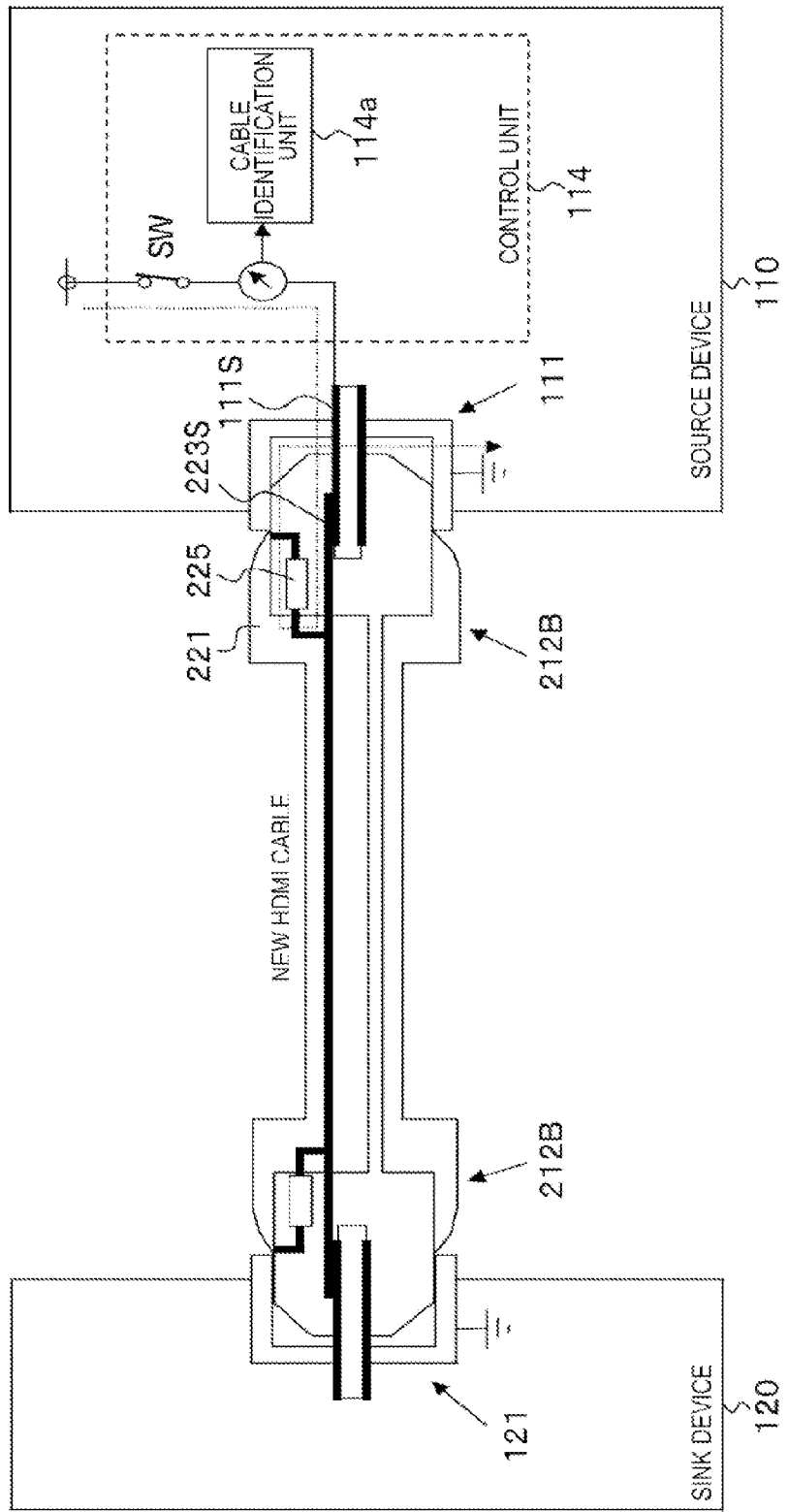
FIG. 33 is a diagram illustrating the state in which the cable is identified as a category B cable (new HDMI cable).

FIG. 33 illustrates the state in which the cable 200 is identified as a category B cable (new HDMI cable). When the cable is a new HDMI cable, the resistor 225 is connected between the target pin (predetermined pin 223S) and the shield shell 221 as described above. Thus, when switch SW is closed to apply a power voltage, for example, +5 V to the target pin (predetermined pin 111S) in the receptacle 111, an electric current flows through the target pin as indicated by a dashed arrow. A cable identification portion 114a of the control unit 114 determines that the cable is conducting by the resistor 225 from the measurement result of the electric current value, and obtains the result of identification that the cable is a category B cable.

Figure 34:
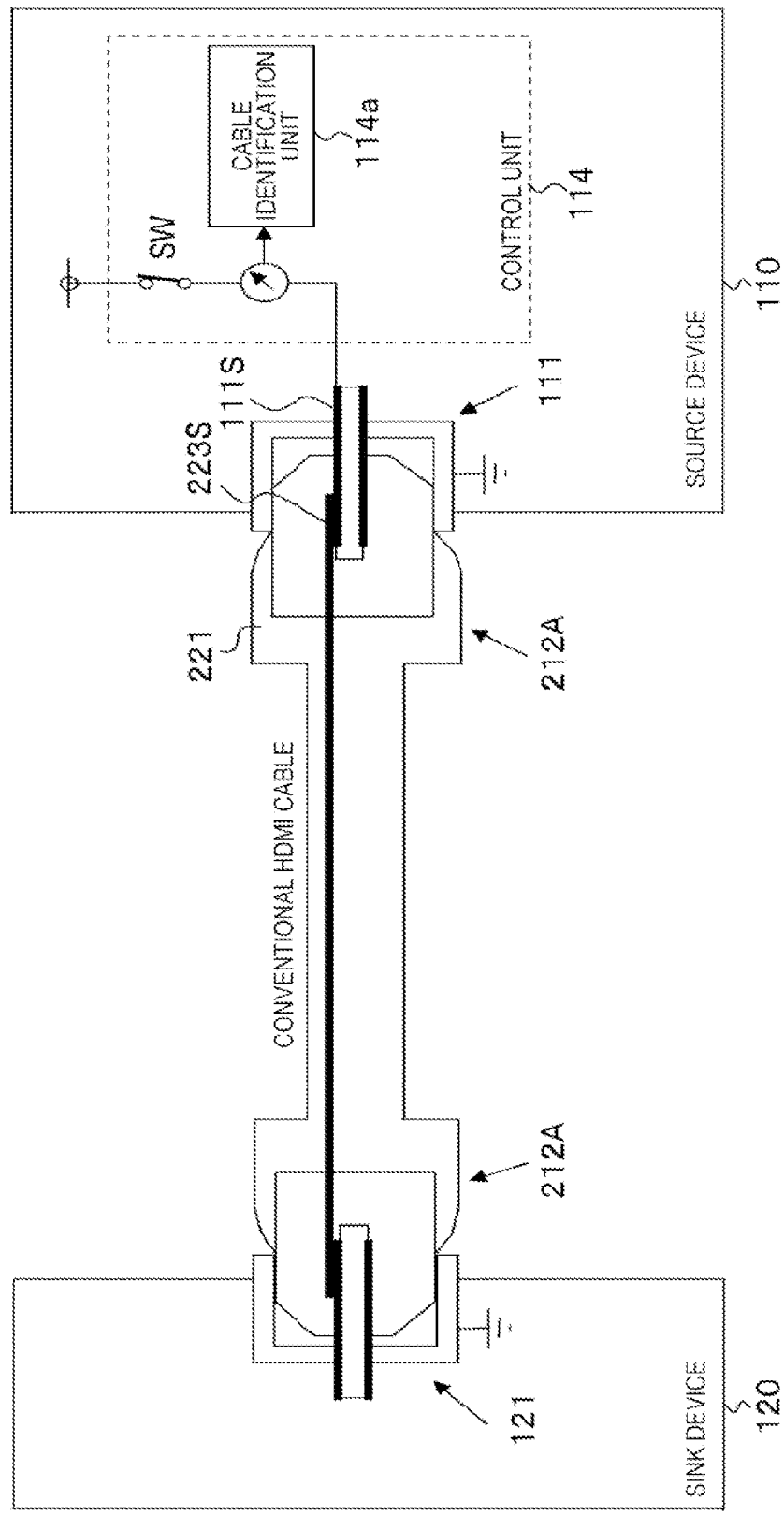
FIG. 34 is a diagram illustrating the state in which the cable is identified as a category A cable (conventional HDMI cable).

FIG. 34 illustrates the state in which the cable is identified as a category cable A (existing HDMI cable). When the cable 200 is an existing HDMI cable, the resistor 225 is not connected between the target pin (predetermined pin 223S) and the shield shell 221 as described above. Thus, even if the switch SW is closed to apply a power voltage, for example, +5 V to the target pin (predetermined pin 111S) in the receptacle 111, no electric current flows through the target pin. The cable identification portion 114a of the control unit 114 determines that the cable is not conducting from the measurement result of the electric current value at that time, and obtains the result of identification that the cable 200 is a category A cable.

Figure 35:
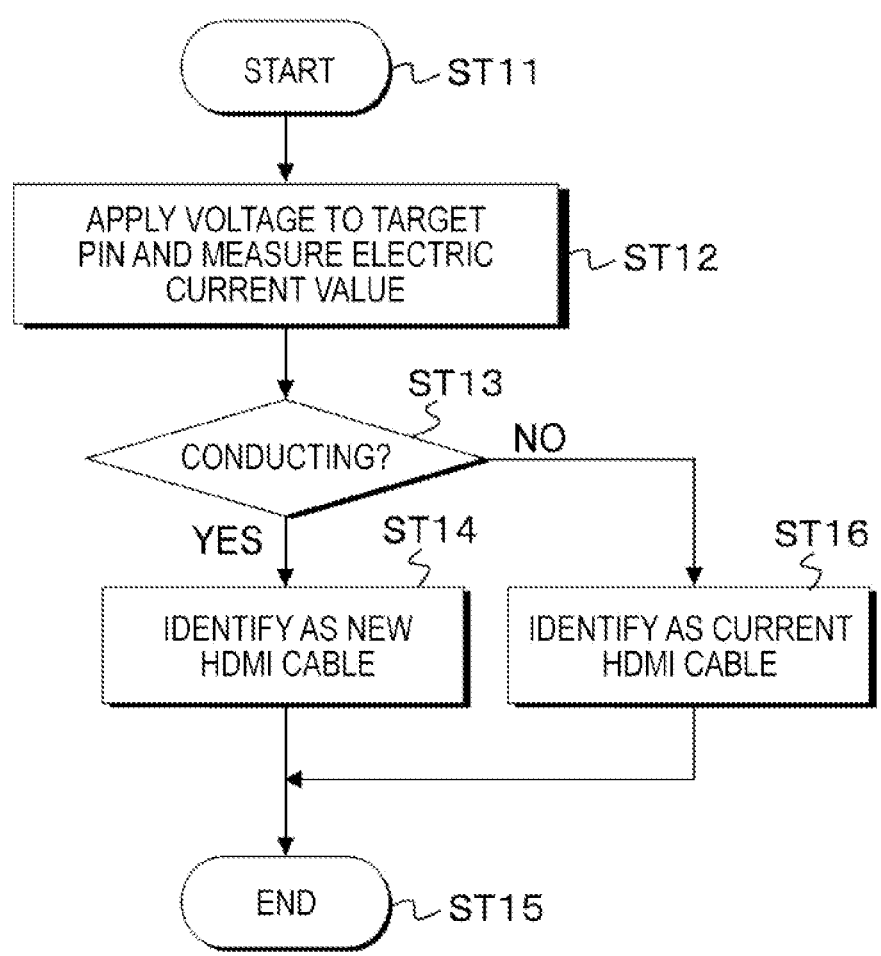
FIG. 35 is a flowchart of an example of a cable determination processing procedure at the control unit of the source device.

FIG. 35 is a flowchart of one example of a cable category identification process by the control unit 114. At step ST11, the control unit 114 starts the process and then moves to step ST12. At step ST12, the control unit 114 closes the switch SW to apply a voltage to the target pin (predetermined pin 111S) in the receptacle 111 and measures the value of an electric current flowing through the target pin.

For example, FIGS. 33 and 34 illustrate that the value of a flowing electric current is directly measured. Alternatively, the measurement of an electrical current value may be made indirectly by arranging a resistor in the electric current path and measuring a voltage drop due to the resistor. In this case, the measurement of an electric current value may be made roughly. Here, the measurement can be sufficiently made by determining whether the electric current value is 0.

Next, at step ST13, the control unit 114 determines whether the cable is conducting. When the electric current value is not 0, the control unit 114 determines whether the cable is conducting. When the cable is conducting, the control unit 114 identifies the cable as a category B cable (new HDMI cable) at step ST14, and after that, terminates the process at step ST15. Meanwhile, when determining that the cable is not conducting, the control unit 114 identifies the cable as a category A cable (existing HDMI cable) at step ST16, and after that, terminates the process at step ST15.

Figure 36:
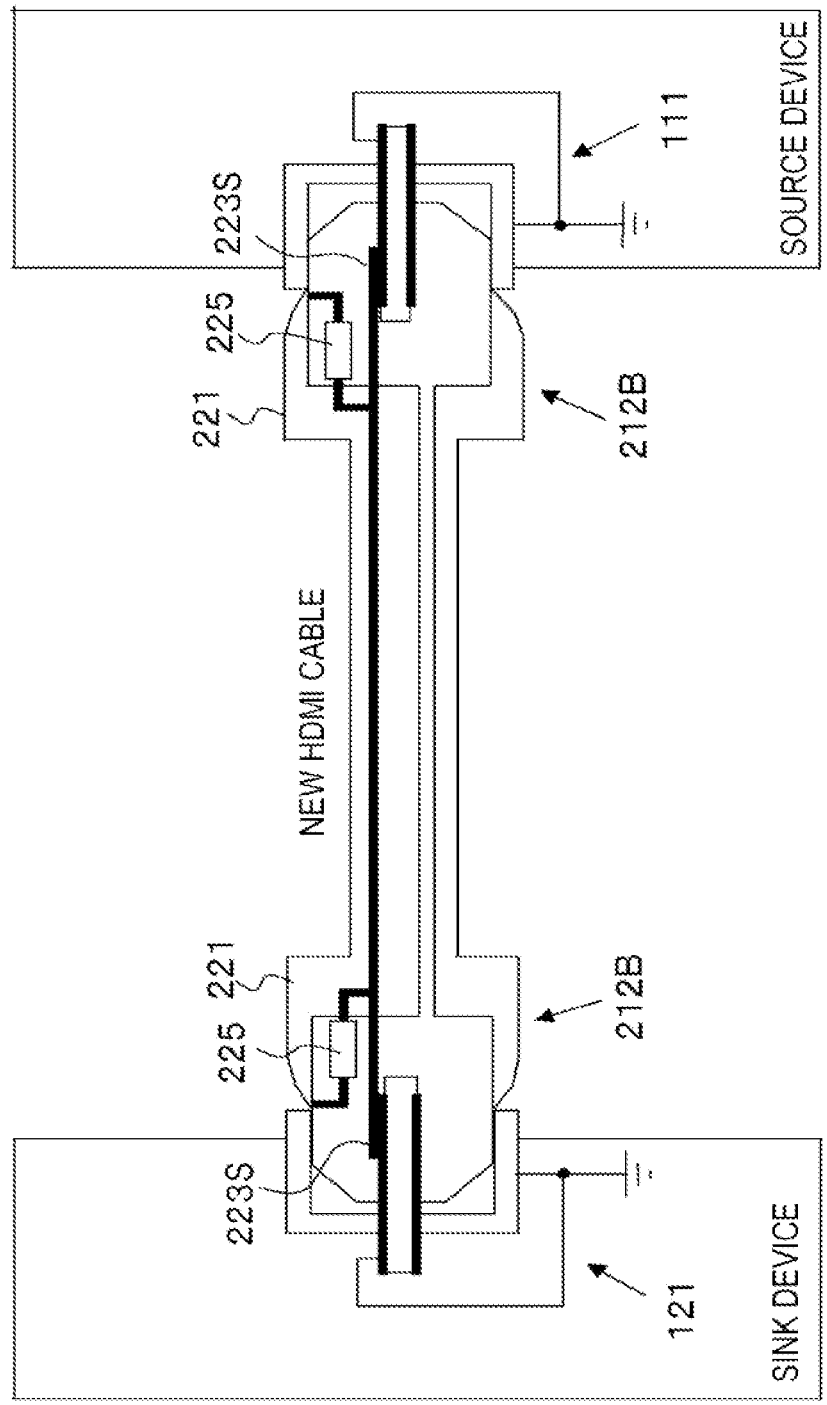
FIG. 36 is a diagram for describing the case in which, when the data transmitting unit of the source device and the data receiving unit of the sink device are conventional HDMI devices, these devices are connected via a new HDMI cable (category B cable).

FIG. 36 illustrates the case in which, when the source device and the sink device are conventional HDMI devices, these devices are connected together via a category B cable (new HDMI cable). Since the pins 223S to which the resistors 225 are connected are originally ground pins, the pins 223S are connected at the ground level in the source and sink devices. In addition, the metallic shell (shield shell) 221 is also connected at the grounding level in the source and sink devices. Thus, even if the resistors 225 are connected between the pin 223S and the metallic shell (shield shell) 221, no influence is exerted on data transmission through the transmission cable from the source device to the sink device, and thus usual operations can be expected.

As described above, the AV system 10 illustrated in FIG. 1 includes the conventional HDMI transmission system (data transmitting unit 112 and data receiving unit 122), and the new HDMI transmission system (data transmitting/receiving unit 113 and data transmitting/receiving unit 123). The new HDMI transmission system transmits video data encoded so as to be DC-free and capable of clock regeneration via a pair of AC-coupled lines (data line pair) of the cable 200. Accordingly, it is possible to increase the transmission bandwidth of video data while improving signal quality and reducing power consumption.

In the AV system 10 illustrated in FIG. 1, the new HDMI transmission system can perform not only data transmission from the source device 110 to the sink device 120 but also data transmission from the sink device 120 to the source device 110. It is thus possible to support new applications for inter-room transmission and the like.

Figure 37:
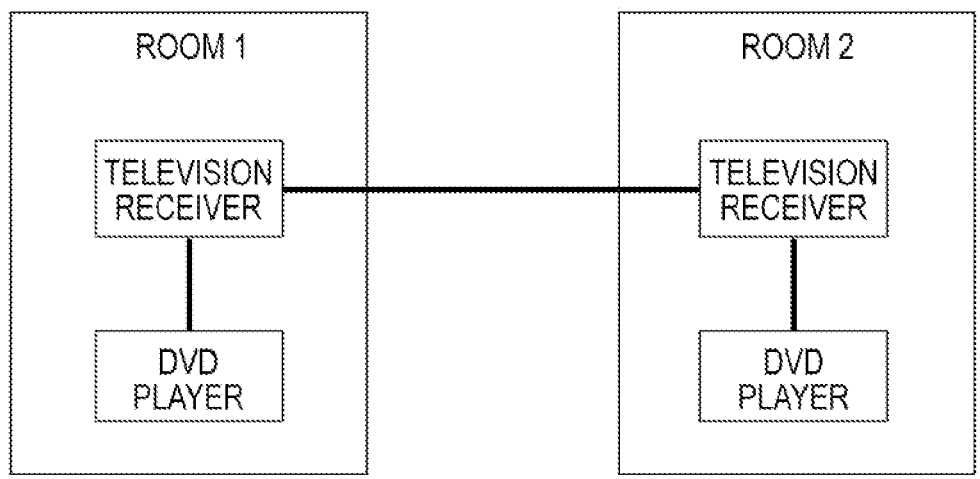
FIG. 37 is a diagram of an example of an application capable of being handled in the new HDMI transmission system.

FIG. 37 illustrates an example of an application. There are television receivers and HDMI-connected DVD players in room 1 and room 2. The room 1 and the room 2 are connected together over a new HDMI cable, and the television receiver in the room 1 is a source device, and the television receiver in the room 2 is a sink device. The HDMI connection in the rooms may be through the conventional HDMI or the new HDMI. When the source device has an output exceeding the conventional HDMI transmission capability, the HDMI connection can be used to view source outputs in the rooms.

If a person viewing the television receiver in the room 2 wishes to view a video content from the DVD player in the room 1, the television receiver in the room 1 repeats an output from the DVD player in the room 1 through the new HDMI connection. Thus, video data corresponding to the foregoing content in the conventional HDMI portion under the new HDMI connection between the rooms is transmitted from the television receiver in the room 1 to the television receiver in the room 2. In this manner, it is possible to view the video content from the DVD player in the room 1, on the television in the room 2.

Similarly, when a person viewing the television in the room 1 wishes to view a video content from the DVD player in the room 2, video data corresponding to the foregoing content from the DVD player in the room 2 is repeated and transmitted over the new HDMI data line under the new HDMI connection from the television receiver in the room 2. In this manner, it is possible to realize bi-directional transmission of uncompressed video data across the rooms, which has been disabled so far.

2. Modification Example

In the foregoing embodiment, the shape of the plug of the new HDMI cable is the same as the shape of the plug of the conventional HDMI cable (existing HDMI cable). Alternatively, the shape of the plug of the new HDMI cable may be different from the shape of the plug of the existing HDMI cable so that, if either the source device or the sink device is not a new HDMI device, these devices cannot be connected over a new HDMI cable.

Figure 38:
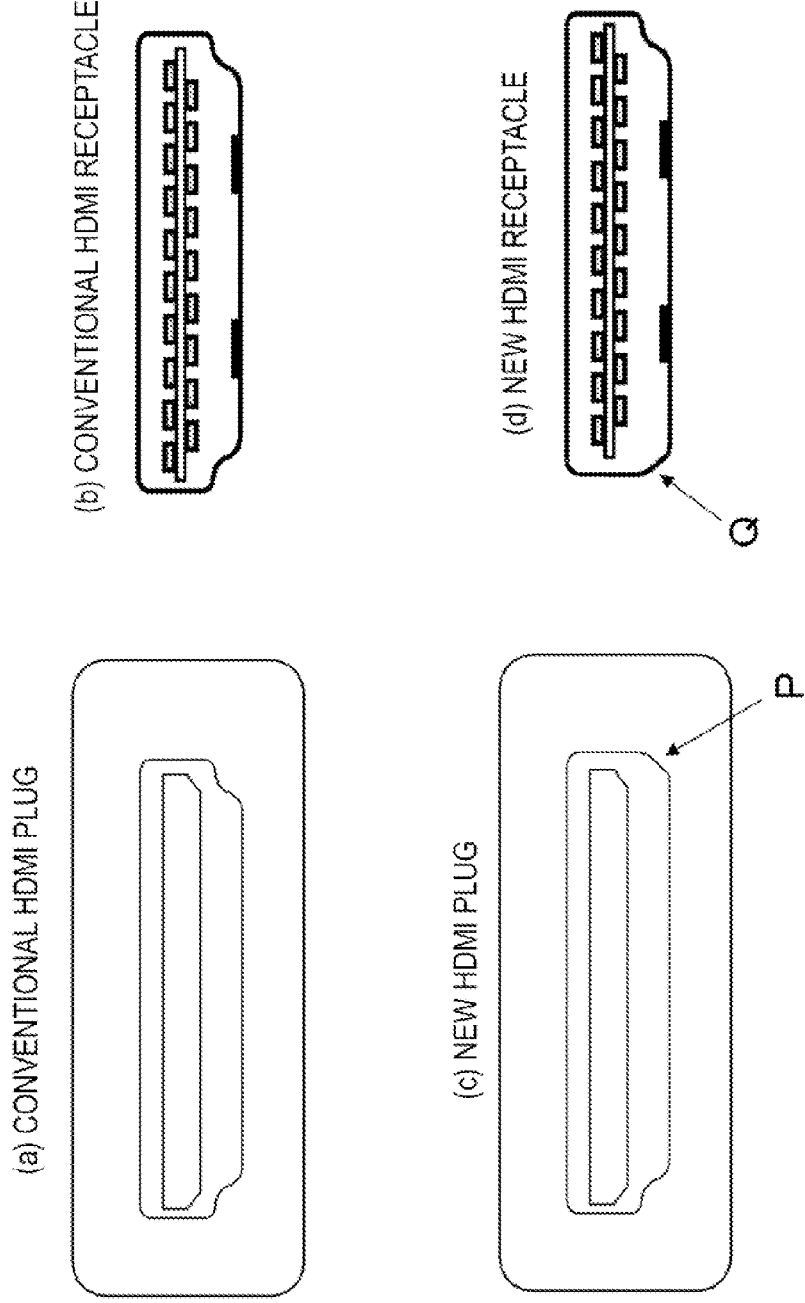
FIG. 38 illustrates diagrams of other examples of shapes of a cable plug and a receptacle of the new HDMI cable.

FIG. 38(a) illustrates the shape of a plug of a conventional HDMI cable, and FIG. 38(b) illustrates the shape of a receptacle of a source device or a sink device supporting only the existing HDMI. FIG. 38(c) illustrates the shape of a plug of a new HDMI cable, and FIG. 38(d) illustrates an example of a shape of a receptacle of a source device or a sink device as a new HDMI device. FIG. 39(a) is a perspective view of a plug of an existing HDMI cable, and FIG. 39(b) is a perspective view of a plug of a new HDMI cable.

The plug of the new HDMI cable has a convex portion (marked with arrow P). The receptacle of the source device or the sink device as a new HDMI device has a concave portion (marked with arrow Q) corresponding to the convex portion of the plug. In this case, the shape of the receptacle of the source device or the sink device as a new HDMI device is configured to match the shape of the plug of the new HDMI cable and encompass the shape of the plug of the existing HDMI cable.

By setting the shape of the plug of the new HDMI cable and the shape of the receptacle of the source device or the sink device as described above, the new HDMI cable can connect to the receptacles of the source device and the sink device supporting the new HDMI. However, the new HDMI cable cannot connect to the receptacles of the source device and the sink device as existing HDMI devices. Accordingly, if either the source device or the sink device is not a new HDMI device, these devices are not connected together over the new HDMI cable. That is, only when both of the source device and the sink device are new HDMI devices, these devices can be connected together via the new HDMI cable.

As described above, the shape of the receptacle of the source device or the sink device as a new HDMI device is configured to match the shape of the plug of the new HDMI cable and encompass the shape of the plug of the existing HDMI cable. Thus, the existing HDMI cable can connect not only to the receptacles of the source device and the sink device as conventional HDMI devices but also to the receptacles of the source device and the sink device as new HDMI devices.

In the foregoing embodiment, video data is composed of red data, green data, and blue data as an example. Alternatively, video data may be composed of brightness data, red differential data, and blue differential data. As a matter of the course, the present technique can also be applied to this case.

In the foregoing embodiment, the present technique is applied to an AV system in which a source device and a sink device are connected together through a digital interface under HDMI standards. The present technique can also be applied to AV systems in which the devices are connected through other similar digital interfaces.

The present technique can be configured as follows.

(1) A transmitting device including: an encoding unit that encodes transmission video data so as to be DC-free and capable of clock regeneration; and a video data transmitting unit that transmits by a differential signal the encoded video data obtained at the encoding unit to an external device over a pair of AC-coupled lines as a transmission path.

(2) The transmitting device according to (1), further including a command signal communication unit that communicates an in-phase command signal to the external device over the pair of lines.

(3) The transmitting device according to (1) or (2), further including a transmission request transmitting unit that, prior to starting of the transmission of the encoded video data, transmits a transmission request to the external device by a differential signal over the pair of lines.

(4) The transmitting device according to (3), wherein the transmission request includes at least information of a clock frequency.

(5) The transmitting device according to any of (2) to (4), wherein, prior to starting of the transmission of the encoded video data, the video signal transmitting unit transmits random data not containing a video timing to the external device over the pair of lines, and after the command signal communication unit receives from the external device a command signal indicating that the clock information can be extracted, the video signal transmitting unit transmits the encoded video data to the external device by a differential signal over the pair of lines.

(6) The transmitting device according to any of (1) to (5), wherein the encoding unit encodes 4-bit data each of red data, green data, and blue data constituting the transmission video data to 5-bit data each so as to be DC-free and capable of clock regeneration, and the video data transmitting unit transmits 15-bit data each composed of the DC-free and clock regenerable 5-bit data each of the red data, the green data, and the blue data which are encoded in the encoding unit.

(7) The transmitting device according to any of (1) to (6), further including: a video data receiving unit that receives the video data encoded so as to be DC-free and capable of clock regeneration by a differential signal over the pair of AC-coupled lines as the transmission path; and a decoding unit that decodes the encoded video data received at the video data receiving unit to obtain reception video data.

(8) A transmitting method including the steps of: encoding transmission video data so as to be DC-free and capable of clock regeneration to obtain encoded video data; and transmitting the encoded video data to an external device by a differential signal over a pair of AC-coupled lines as a transmission path.

(9) A receiving device including: a video data receiving unit that receives from an external device encoded video data so as to be DC-free and capable of clock regeneration by a differential signal over a pair of AC-coupled lines as a transmission path; and a decoding unit that decodes the encoded video data received at the video data receiving unit to obtain reception video data.

(10) A transmitting device including: a first video data transmitting unit that transmits first video data to an external device over a DC-coupled differential signal line constituting a transmission path; a second video data transmitting unit that transmits to the external device second video data related to the first video data or independent from the first video data by an AC-coupled differential signal line constituting the transmission path; and a control unit that controls operations of the first video data transmitting unit and the second video data transmitting unit.

(11) The transmitting device according to (10), wherein, when the second video data transmitting unit is not used, the control unit grounds the AC-coupled differential signal line.

(12) The transmitting device according to (10) or (11), wherein the control unit controls operations of the second video data transmitting unit, based on whether the external device accepts the second video data transmitting unit and whether the transmission path accepts the second video data transmitting unit.

(13) The transmitting device according to (12), wherein the control unit determines whether the external device accepts the second video data transmitting unit, based on information of capability of the external device read from the external device via the transmission path.

(14) The transmitting device according to (12) or (13), wherein the control unit determines whether the transmission path accepts the second video data transmitting unit, based on an information provision function of the transmission path.

(15) The transmitting device according to (14), wherein the control unit determines whether the transmission path accepts the second video data transmitting unit, by applying a predetermined voltage to a predetermined pin in a receptacle for connecting the plug of the cable.

(16) The transmitting device according to any of (10) to (15), further including a frame division processing unit that divides transmission video data into frames to obtain a plurality of divided video data, wherein the first video data transmitting unit transmits some divided video data of the plurality of divided video data to the external device, and the second video data transmitting unit transmits some of the remaining of the divided video data of the plurality of divided video data to the external device.

(17) The transmitting device according to (16), wherein the first video data transmitting unit and the second video data transmitting unit transmit the divided video data in each frame, together with first information indicative of the presence of another divided video data to coupled and second information for synchronization with the other divided video data to be coupled.

(18) The transmitting device according to (17), wherein the second information includes time code information and arrangement sequence of a plurality of frames having a time code indicated by the time code information.

(19) The transmitting device according to (10), further including a pixel data division processing unit that halves each pixel data of the transmission video data into a higher bit side and a lower bit side, wherein the first video data transmitting unit transmits the higher bit-side data of the pixel data to the external device, and the second video data transmitting unit transmits the lower bit-side data of the pixel data to the external device.

(20) The transmitting device according to (10), wherein the first video data transmitting unit transmits one of left-eye video data and right-eye video data to the external device, and the second video data transmitting unit transmits the other of the left-eye video data and right-eye video data to the external device.

(21) The transmitting device according to any of (10) to (20), further including a video data receiving unit that receives video data from the external device via the AC-coupled differential signal line, wherein the control unit controls not only operations of the first video data transmitting unit and the second video data transmitting unit but also operations of the video data receiving unit.

(22) A receiving device including: a first video data receiving unit that receives first video data via a DC-coupled differential signal line constituting a transmission path; a second video data receiving unit that receives second video data related to the first video data or independent from the first video data via an AC-coupled differential signal line constituting the transmission path; and a control unit that controls operations of the first video data receiving unit and the second video data receiving unit.

REFERENCE SIGNS LIST

10 AV SYSTEM
81 HDMI TRANSMITTER
82 HDMI RECEIVER
83, 84 HDMI TRANSMITTING/RECEIVING UNIT
110 SOURCE DEVICE
111 Receptacle
112 DATA TRANSMITTING UNIT
113 Data transmitting/receiving unit
114 CONTROL UNIT
120 SINK DEVICE
121 Receptacle
122 DATA RECEIVING UNIT
123 Data transmitting/receiving unit
124 CONTROL UNIT
200 CABLE
201, 202 PLUG

The invention claimed is:

1. A transmitting device comprising:
an encoding unit that encodes transmission data so as to be DC-free and capable of clock regeneration; and
a data transmitting unit that transmits by a differential signal the encoded data obtained at the encoding unit to an external device over a pair of AC-coupled lines as a transmission path,
in which the transmission path is a TMDS (Transition Minimized Differential Signaling) channel, and
in which the data transmitting unit transmits the encoded data by the differential signal to the external device by way of the TMDS channel without transmitting a TMDS clock associated therewith.

2. The transmitting device according to claim 1, further comprising a command signal communication unit that communicates an in-phase command signal to the external device over the pair of lines.

3. The transmitting device according to claim 2, wherein prior to starting of the transmission of the encoded data, the data transmitting unit transmits random data not containing a timing to the external device over the pair of lines, and after the command signal communication unit receives from the external device a command signal indicating that the clock information can be extracted, the data transmitting unit transmits the encoded data to the external device by a differential signal over the pair of lines.

4. The transmitting device according to claim 1, further comprising a transmission request transmitting unit that, prior to starting of the transmission of the encoded data, transmits a transmission request to the external device by a differential signal over the pair of lines.

5. The transmitting device according to claim 4, wherein the transmission request includes at least information of a clock frequency.

6. The transmitting device according to claim 1, further comprising:
a data receiving unit that receives from the external device the data encoded so as to be DC-free and capable of clock regeneration by a differential signal over the pair of AC-coupled lines as the transmission path; and
a decoding unit that decodes the encoded data received at the data receiving unit to obtain reception data.

7. A transmitting device comprising:
an encoding unit that encodes transmission data so as to be DC-free and capable of clock regeneration; and
a data transmitting unit that transmits by a differential signal the encoded data obtained at the encoding unit to an external device over a pair of AC-coupled lines as a transmission path,
in which the encoding unit encodes 4-bit data each of color data, brightness data, and color difference data constituting the transmission data to 5-bit data each so as to be DC-free and capable of clock regeneration, and in which the data transmitting unit transmits 15-bit data each composed of the DC-free and clock regenerable 5-bit data which is encoded in the encoding unit.

8. A transmitting method comprising the steps of:
encoding transmission data so as to be DC-free and capable of clock regeneration to obtain encoded data; and
transmitting the encoded data to an external device by a differential signal over a pair of AC-coupled lines as a transmission path,
in which the transmission path is a TMDS (Transition Minimized Differential Signaling) channel, and
in which the data transmitting step transmits the encoded data by the differential signal to the external device by way of the TMDS channel without transmitting a TMDS clock associated therewith.

9. A transmitting device comprising:
a first data transmitting unit that transmits first data to an external device over a DC-coupled differential signal line constituting a transmission path;
a second data transmitting unit that transmits to the external device second data related to the first data or independent from the first data by an AC-coupled differential signal line constituting a transmission path; and
a control unit that controls operations of the first data transmitting unit and the second data transmitting unit,
in which the transmission path of the first data transmitting unit is a number of first type TMDS (Transition Minimized Differential Signaling) channels,
in which the transmission path of the second data transmitting unit is a number of second type TMDS (Transition Minimized Differential Signaling) channels different from the first type TMDS channels, and
in which the second data transmitting unit transmits the second data by the AC-coupled differential signal to the external device by way of one or more of the second type TMDS channels without transmitting a TMDS clock associated therewith.

10. The transmitting device according to claim 9, wherein, when the second data transmitting unit is not used, the control unit grounds the AC-coupled differential signal line.

11. The transmitting device according to claim 9, wherein the control unit controls operations of the second data transmitting unit, based on whether the external device accepts the second data transmitting unit and whether the transmission path accepts the second data transmitting unit.

12. The transmitting device according to claim 11, wherein the control unit determines whether the external device accepts the second data transmitting unit, based on information of capability of the external device read from the external device via the transmission path.

13. The transmitting device according to claim 11, wherein the control unit determines whether the transition path accepts the second data transmitting unit, based on an information provision function of the transmission path.

14. The transmitting device according to claim 13, wherein the transmission path is a cable and the control unit determines whether the transmission path accepts the second data transmitting unit, by applying a predetermined voltage to a predetermined pin in a receptacle for connecting the plug of the cable.

15. The transmitting device according to claim 9, further comprising a data receiving unit that receives data from the external device via the AC-coupled differential signal line, wherein
the control unit controls not only operations of the first data transmitting unit and the second data transmitting unit but also operations of the data receiving unit.

16. A transmitting device comprising:
a first data transmitting unit that transmits first data to an external device over a DC-coupled differential signal line constituting a transmission path;
a second data transmitting unit that transmits to the external device second data related to the first data or independent from the first data by an AC-coupled differential signal line constituting the transmission path;
a control unit that controls operations of the first data transmitting unit and the second data transmitting unit; and
a frame division processing unit that divides transmission data into frames to obtain a plurality of divided data,
in which the first data transmitting unit transmits some divided data of the plurality of divided data to the external device, and the second data transmitting unit transmits some of the remaining of the divided data of the plurality of divided data to the external device.

17. The transmitting device according to claim 16, wherein the first data transmitting unit and the second data transmitting unit transmit the divided data in each frame, together with first information indicative of the presence of another divided data to coupled and second information for synchronization with the other divided data to be coupled.

18. The transmitting device according to claim 17, wherein the second information includes time code information and arrangement sequence of a plurality of frames having a time code indicated by the time code information.

19. A transmitting device comprising:
a first data transmitting unit that transmits first data to an external device over a DC-coupled differential signal line constituting a transmission path;
a second data transmitting unit that transmits to the external device second data related to the first data or independent from the first data by an AC-coupled differential signal line constituting the transmission path;
a control unit that controls operations of the first data transmitting unit and the second data transmitting unit; and
a pixel data division processing unit that halves each pixel data of the transmission data into a higher bit side and a lower bit side,
in which the first data transmitting unit transmits the higher bit-side data of the pixel data to the external device, and
in which the second data transmitting unit transmits the lower bit-side data of the pixel data to the external device.

20. A transmitting device comprising:
a first data transmitting unit that transmits first data to an external device over a DC-coupled differential signal line constituting a transmission path;
a second data transmitting unit that transmits to the external device second data related to the first data or independent from the first data by an AC-coupled differential signal line constituting the transmission path; and
a control unit that controls operations of the first data transmitting unit and the second data transmitting unit,
in which the first data transmitting unit transmits one of left-eye data and right-eye data to the external device, and
in which the second data transmitting unit transmits the other of the left-eye data and right-eye data to the external device.

* * * * *